US006665079B1

(12) United States Patent
Tocci et al.

(10) Patent No.: US 6,665,079 B1
(45) Date of Patent: Dec. 16, 2003

(54) METHOD AND APPARATUS FOR LOCATING ELECTROMAGNETIC IMAGING AND DETECTION SYSTEMS/DEVICES

(75) Inventors: Michael D. Tocci, Sandia Park, NM (US); Nora C. Tocci, Sandia Park, NM (US); John D. German, Cedar Crest, NM (US); Kirk W. Doss, Albuquerque, NM (US); Eric J. Cramer, Albuquerque, NM (US); C. David Cremer, Albuquerque, NM (US)

(73) Assignee: Science & Engineering Associates, Inc., Albuquerque, NM (US)

( * ) Notice: Subject to any disclaimer, the term of this patent is extended or adjusted under 35 U.S.C. 154(b) by 0 days.

(21) Appl. No.: 09/490,656

(22) Filed: Jan. 24, 2000

Related U.S. Application Data

(60) Provisional application No. 60/125,988, filed on Mar. 24, 1999.

(51) Int. Cl.[7] .............................................. G01B 11/14

(52) U.S. Cl. ........................................................ 356/614
(58) Field of Search .......................... 356/614, 615–624

(56) References Cited

U.S. PATENT DOCUMENTS 5,485,012 A    1/1996 Liebson ................. 250/339.06

Primary Examiner—Frank G. Font
Assistant Examiner—Amanda Merlino
(74) Attorney, Agent, or Firm—Perkins, Smith & Cohen LLP; Jacob N. Erlich; Jerry Cohen

(57) ABSTRACT

A method and apparatus utilizing a series of optical components and systems which effectively detect and locate electromagnetic imaging or detection systems or devices, such as cameras and passive infrared detectors. A light source is arranged in a specially-prescribed manner, and is used in conjunction with imaging optics to illuminate an area. Any electromagnetic imaging or detection system in the illuminated area is detected with either the user's eye directly, or with detection optics to determine the existence of such electromagnetic imaging or detection system.

77 Claims, 26 Drawing Sheets

METHOD AND APPARATUS FOR LOCATING ELECTROMAGNETIC IMAGING AND DETECTION SYSTEMS/DEVICES

CROSS-REFERENCE TO RELATED APPLICATIONS

This application claims priority of co-pending U.S. provisional application Ser. No. 60/125,988 entitled METHOD AND APPARATUS FOR LOCATING HIDDEN CAMERAS filed Mar. 24, 1999.

BACKGROUND OF THE INVENTION

This invention relates generally to the detection of electromagnetic imaging and/or detection systems, and more particularly to a method and apparatus for detecting and locating hidden cameras.

Hidden cameras are becoming commonplace. These cameras are used to observe and/or record pictures of someone else's activities without their knowledge. In most cases it's legal, and often necessary. In places such as banks, convenience stores, government facilities, and casinos, hidden cameras are used to help prevent crime and identify criminals. However, the laws of only a few states expressly prohibit the unauthorized installation or use of cameras in private places. This means that, in most states, the use of a hidden camera in a private place without the permission of the people being observed is not expressly prohibited.

A decade ago, covert video surveillance was not a serious problem since state-of-the-art video equipment was expensive, bulky, and difficult-to-find. Now, covert video equipment is extremely advanced, tiny, inexpensive, and ludicrously easy to find. These tiny video cameras can be hidden virtually anywhere, with an aperture of less than $\frac{1}{8}$ inch in diameter. In fact they are commonly sold, already installed, inside such everyday items as exit signs, smoke detectors, sunglasses, picture frames, telephones, houseplants, clocks, writing pens, wristwatches, briefcases, and even teddy bears.

The lax video surveillance laws in most states, coupled with the increasing availability of high-quality spy cameras, make covert video surveillance a real concern for many people. Mass media coverage of hidden camera video voyeurs is on the rise. As public awareness of this issue increases, so does paranoia. People would like to feel secure that they are not being videotaped, especially in private places like their own homes and offices.

It is therefore an object of this invention to effectively detect and locate cameras, passive infra-red (PIR) detectors, and other electromagnetic imaging or detection systems.

It is another object of this invention to effect such detection and location without reliance on electronic signals emitted by the electromagnetic imaging or detection system.

It is still another object of this invention to perform such detection and location via an optical system which avoids problems associated with electronic or magnetic shielding.

It is a further object of this invention to effect such detection regardless of whether the electromagnetic imaging or detection system is on or off, is electronic in nature and/or includes auto-focussing mechanisms.

SUMMARY OF THE INVENTION

The objects set forth above as well as further and other objects and advantages of the present invention are achieved by the embodiments of the invention described hereinbelow.

The present invention utilizes a series of optical components and systems to detect and locate electromagnetic imaging and detection systems, such as cameras or PIR detectors, which, in many instances, are hidden. The basic concept of the present invention involves illuminating by a beam of electromagnetic radiation or energy an area in which a hidden camera is located. When this beam of electromagnetic radiation, in the form of light, for example, hits the camera lens, it is focused onto a partially-reflective imaging plane (like the CCD plane in a video camera). Some of the light is then retro-reflected back through the lens in the same direction from which it originated. In one embodiment of the invention, electromagnetic imaging and detection systems, such as hidden cameras are highlighted by continuous light such as bright red light against a green background, for easy identification by the user. In another embodiment of the invention, electromagnetic imaging and detection systems are highlighted by flashing light such as flashing red light against a non-flashing background, for easy identification by the user. In further embodiments, detection is accomplished by further and other characterizations of the beam of electromagnetic radiation and detected electronically with the use of optical sensors. Even further embodiments of the present invention provide further enhancements which include, but are not limited to, for example, scanning of the emitted beam under computer control.

For a better understanding of the present invention, together with other and further objects thereof, reference is made to the accompanying drawings and detailed description and its scope will be pointed out in the appended claims.

DETAILED DESCRIPTION OF THE PREFERRED EMBODIMENTS

In the following descriptions of the present invention, the term "electromagnetic radiation (energy)" includes, for example, light and any other forms of electromagnetic radiation (energy) with wavelength(s) in the range from 0.1 micron to 15 microns. Also, in the following description, the term "electromagnetic imaging and detection system" includes a camera or any other device or system that utilizes a focusing mechanism to detect and/or image electromagnetic radiation with wavelength(s) in the range from 0.1 micron to 15 microns.

Figure 1:
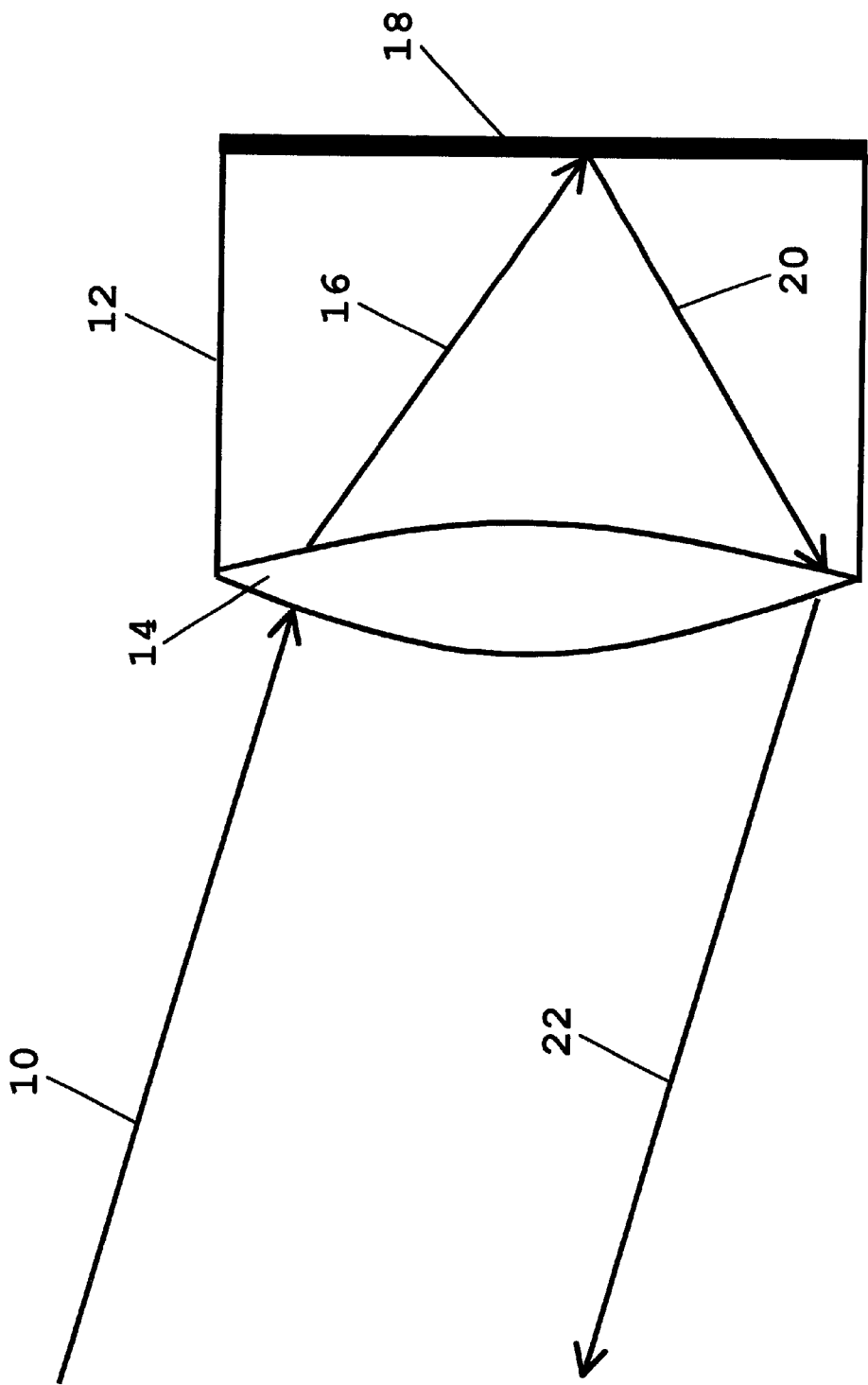
FIG. 1 is a schematic illustration of the principle involved in describing the present invention.

The basic concept of the present invention involves illuminating an area in which a hidden camera is located. When light hits the camera lens, it is focused onto a partially-reflective imaging plane (like the CCD plane in a video camera). Some of the light is then retro-reflected back through the lens in the same direction from which it originated. FIG. 1 shows a schematic of this principle. A ray of light 10 from some outside source is incident on a target imaging system 12. In passing through the imaging system's objective lens 14, the light refracts 16 and is focused on an imaging plane 18. The imaging plane 18 may be, but is not limited to, a CCD array, a microchannel plate, an image intensifier, a photodiode or array of photodiodes, a diffuse screen, or a retina, for example. In any case, the imaging plane 18 is at least partially reflective. Thus, light is then reflected 20 back out toward the objective lens 14, and is once again refracted. The light emerges 22 from the imaging system 12 in a direction equal and opposite to the incoming light beam 10.

Figure 2:
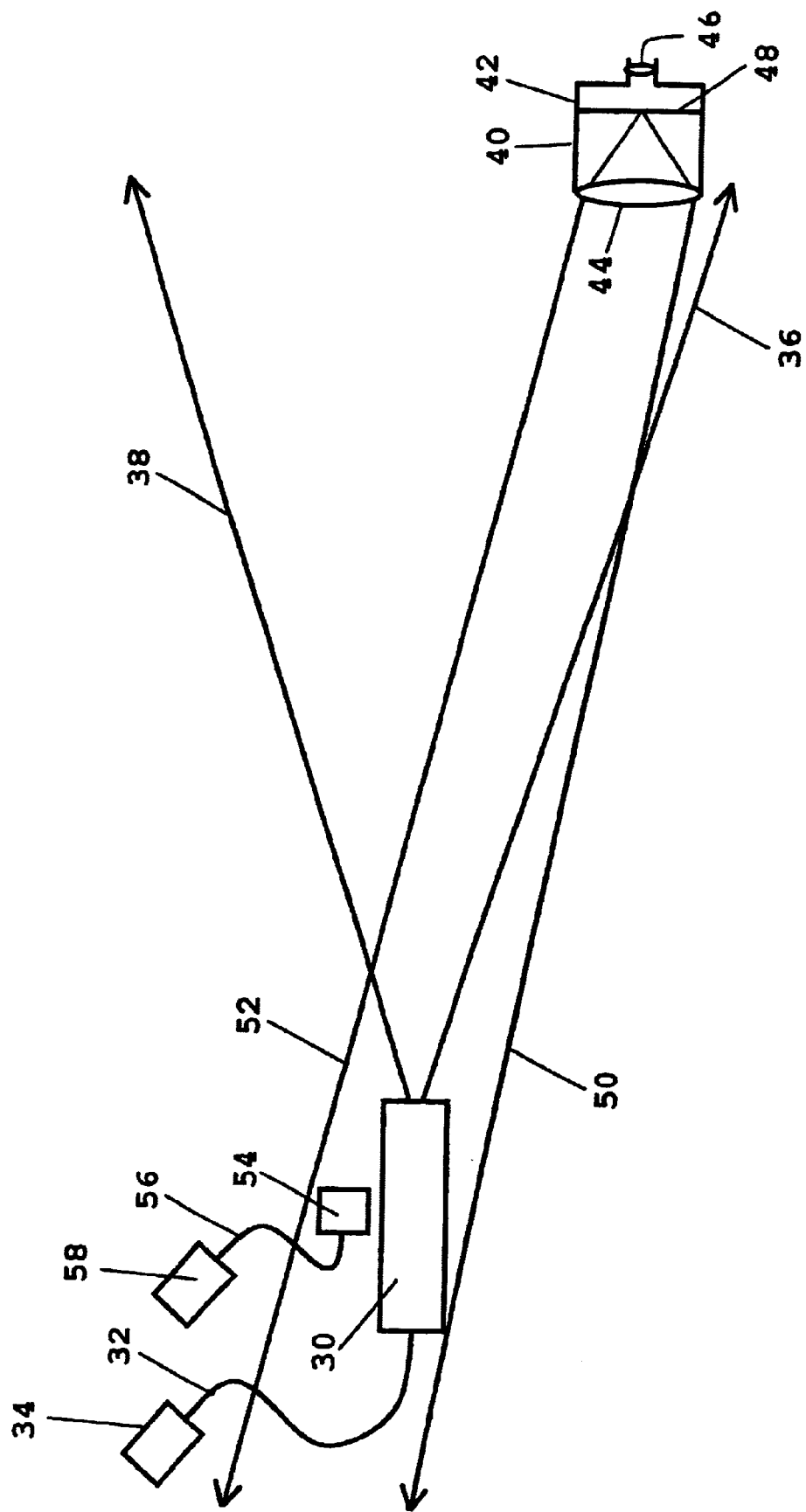
FIG. 2 is a schematic illustration of components making up the basic concept of the present invention.

FIG. 2 shows the basic concept of the present invention where an illumination output source 30 (which may or may not be connected, via optical and/or electronic means 32, to control electronics and/or optics 34) is used in conjunction with an optical receiving means 54 (which may or may not be connected via optical and/or electronic means 56, to control electronics and/or optics 58) to detect retro-reflections from a target such as a hidden imaging system 40. The illumination output source 30 is said to be an "on-axis illuminator," because the illumination output source 30 is "on-axis" with (or "very near") the optical receiving means 54 thus the receiver is capable of receiving light from source 30 retro-reflected from the target. In practice, the brightness of light retro-reflected from an imaging system 40, such as a camera, is much greater than the brightness of light scattered from a diffuse surface (such as a white wall, for example). The reason for this is that the retro-reflected light is confined within a defined retro-reflected light zone (between ray 50 and ray 52) while diffusely scattered light is reflected evenly in all directions. Thus the distinction is made between "retro-reflected light", which is confined within a narrow retro-reflected light zone, and "diffusely scattered light" or "reflected light from shiny objects", which is scattered over a much larger reflected light zone. While diffusely scattered light and reflected light from shiny objects may be detected from any position, detecting the retro-reflected light will be successful only if the optical receiving means 54 is either totally or partially within the defined retro-reflected light zone. Another way of saying this is that the optical receiving means 54 and the illumination output source 30 must be "on-axis" (or "very near") with each other in order for the optical receiving means 54 to receive the retro-reflected light. Otherwise, if the optical receiving means 54 is placed completely outside the retro-reflected light zone (so that it is "off-axis" from the illumination output source 30), it will no longer be able to detect the retro-reflected light, between rays 50 and 52. However, it will still be able to detect both diffusely scattered light and reflected light from shiny objects.

Light emitted from source 30 illuminates an area, broad or narrow in dimension, defined by the rays 36 and 38. Thus, the space in between rays 36 and 38 is illuminated by the source and the space outside rays 36 and 38 is not illuminated by the source. Output source 30 may be comprised of any type of light source, such as a light bulb (with or without a filter), an LED, optical fiber, or a laser. Furthermore, the light emitted from output source 30 may originate from some outside control optical and/or electronic system 34, and such light may be transmitted via optical transfer means 32 to the output source 30 for emission. Furthermore, output source 30 may or may not include beam-shaping optics such as a holographic diffuser, an optical fiber, a lens, a line generator, a mirror, a diffraction element, etc. Furthermore, output source 30 may emit electromagnetic radiation at any wavelength or range of wavelengths, including ultraviolet (0.1–0.4 micron), visible (0.4–0.7 micron), and infrared (0.7–15 micron).

When a target imaging system 40 is inside the space that is illuminated by the source 30, it will retro-reflect part of the source illumination. The term target as used herein refers to any optical detection device whose presence and/or location is to be determined by the user of the present invention. Such a device will generally include a housing 42 fitted with an objective lens 44 of either the refracting or reflecting type. It may include an eyepiece 46 to view the image formed by the objective lens. It may also include an imaging plane 48, which may consist of a CCD array, micro-channel plate, photo-diode array, image intensifier tube, diffusing screen, or otherwise. In the case that an imaging plane 48 is not included, a human eye is used behind the eyepiece 46 for viewing. Furthermore in this case, the human retina is the location where the image is formed by the objective lens and therefore it is the human retina in this case that serves as the imaging plane 48.

Light from the imaging plane 48 is retro-reflected back out through the objective lens 44, and is nearly collimated in the direction from which it originally was incident on the objective lens (that is, it is nearly collimated in the direction of the light source 30). This retro-reflected light is confined between ray paths 50 and 52. Therefore, in order for the present invention to work, an optical receiving means 54 of some type (such as a human eye, or a CCD camera, or an optical fiber, or a photodetector), with or without its own set of imaging optics, must be placed at least partially within the defined retro-reflected light zone of the on-axis illuminator 30, so that said optical receiving means 54 can intercept some or all of the retro-reflected light between rays 50 and 52.

Figure 3:
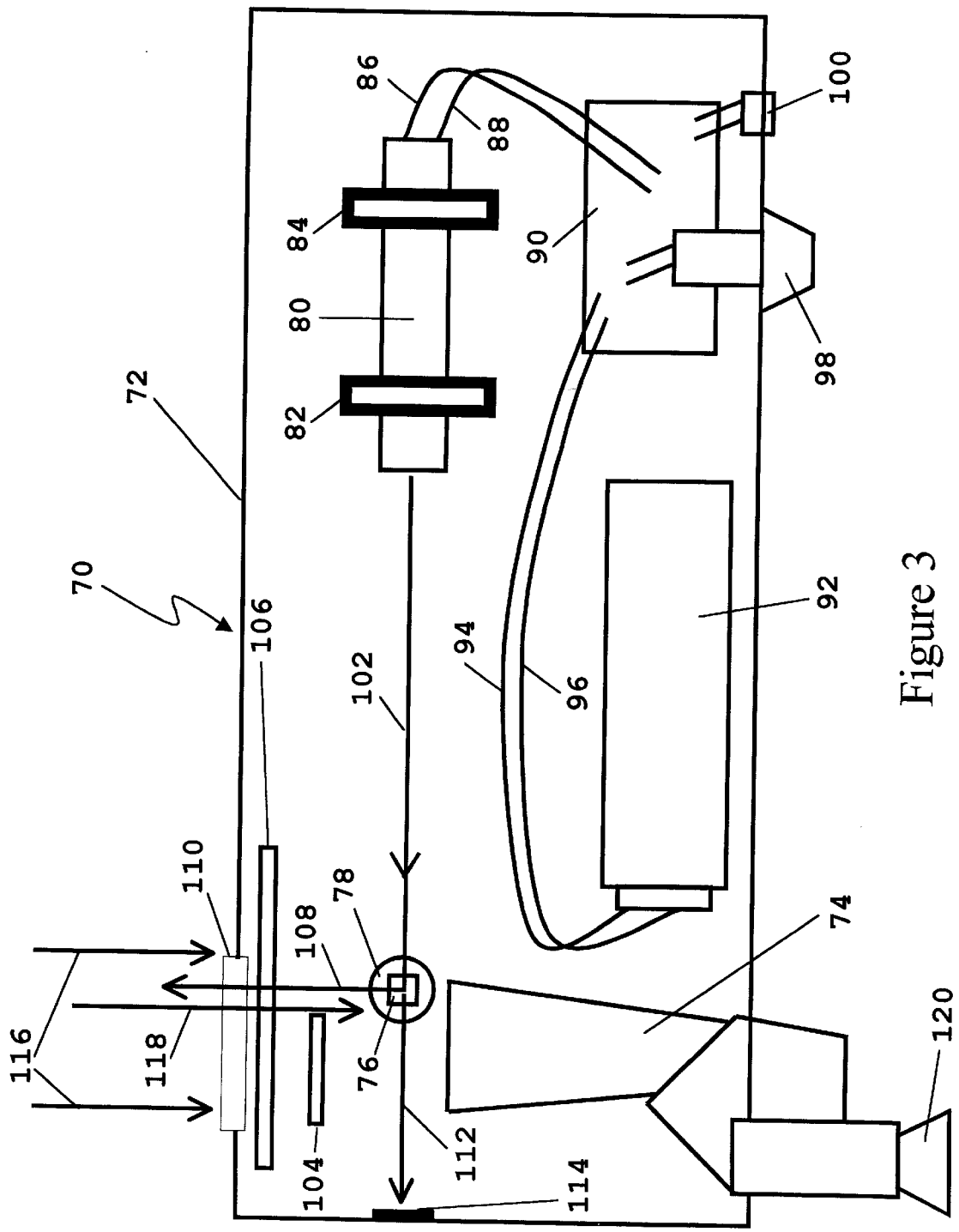
FIG. 3 is a schematic illustration of a preferred embodiment of the present invention.

FIG. 3 shows a schematic diagram of a preferred embodiment of the apparatus 70 of the invention. All parts of apparatus 70 of the invention are contained within or connected to a housing 72, which in this case is made of aluminum, but may be made of any durable material such as plastic, wood, or metal. The miniature telescope 74 (preferably manufactured by Tasco, purchased through Edmund Scientific, part #Y1568) is mounted into the housing 72. In front of the telescope 74 is a polarizing beam-splitter 76 (preferably by Spindler & Hoyer, part #33 5561), which is glued or otherwise affixed to a mounting post 78. A laser diode module 80 (preferably a red, 635 nm wavelength laser, such as one made by Thorlabs, part #CPFS63AP05ME) is mounted to the housing 72 with forward mounting post 82 and rear mounting post 84. It is important to note that although a red, 635-nm wavelength laser diode 80 is preferably utilized as the on-axis illuminator in this particular embodiment, the invention is not limited to any particular color, wavelength, or style of light source (laser, LED, lamp, etc.). The laser diode module 80 is connected via electrical wires 86 and 88 to the power supply board 90 (preferably stock item from MondoTronics). A power source such as a 9-volt battery 92 (Energizer, part #522) is connected via electrical wires 94 and 96 to the power supply circuit or board 90. An on/off switch 98 and on/off indicator LED 100 (included with MondoTronics power supply board 90) are also connected to the power supply board 90 and mounted into the housing 72. The above specific examples of components are provided as illustrative examples of workable components within the present invention. It should be realized that these components can be varied and substituted for by a wide range of equivalents all within the spirit and scope of this invention.

Preferably, in this embodiment, red light 102 emanating from the laser diode module 80 is aimed at the beamsplitter 76. The laser diode module 80 is aligned in its mounting posts 82 and 84 such that its polarization is aligned with the beamsplitter's 76 reflection polarization orientation. This way, the vast majority of red laser light 102 is reflected as beam 108 out of the housing, and only a very small portion is allowed to pass directly through as beam 112 the beamsplitter 76 to hit a diffusing beam block 114 (preferably a soft piece of Velcro®). Red light that is reflected 108 from the beamsplitter 76 first passes by a green filter 104 (without passing through it) and then passes through a polarizing filter 106 (which is oriented to allow the maximum amount of laser light 108 to pass through it) before exiting through an aperture 110 (which may in certain circumstances be covered by a transparent member, and may even include a filter) in the housing 72. Light from the scene being observed 116 along with retro-reflected red laser illumination 118 enters the aperture 110 in the housing 72. Both the scene light 116 and the retro-reflected red light 118 pass through the polarizing filter 106. The retro-reflected light 118 then passes by the green filter 104 without passing through it. Some of the retro-reflected light 118 also passes directly through the beamsplitter 76. Finally, the retro-reflected light 118 enters the telescope 74. Most of the scene light 116 passes through the green filter 104 (although a small portion does pass by it without passing through it). The scene light 116 then also enters the telescope 74. The entire scene, including scene light 116 which has passed through a green filter 104 and retro-reflected red laser illumination light 118, is finally viewed through the telescope's eyepiece 120.

Figure 4:
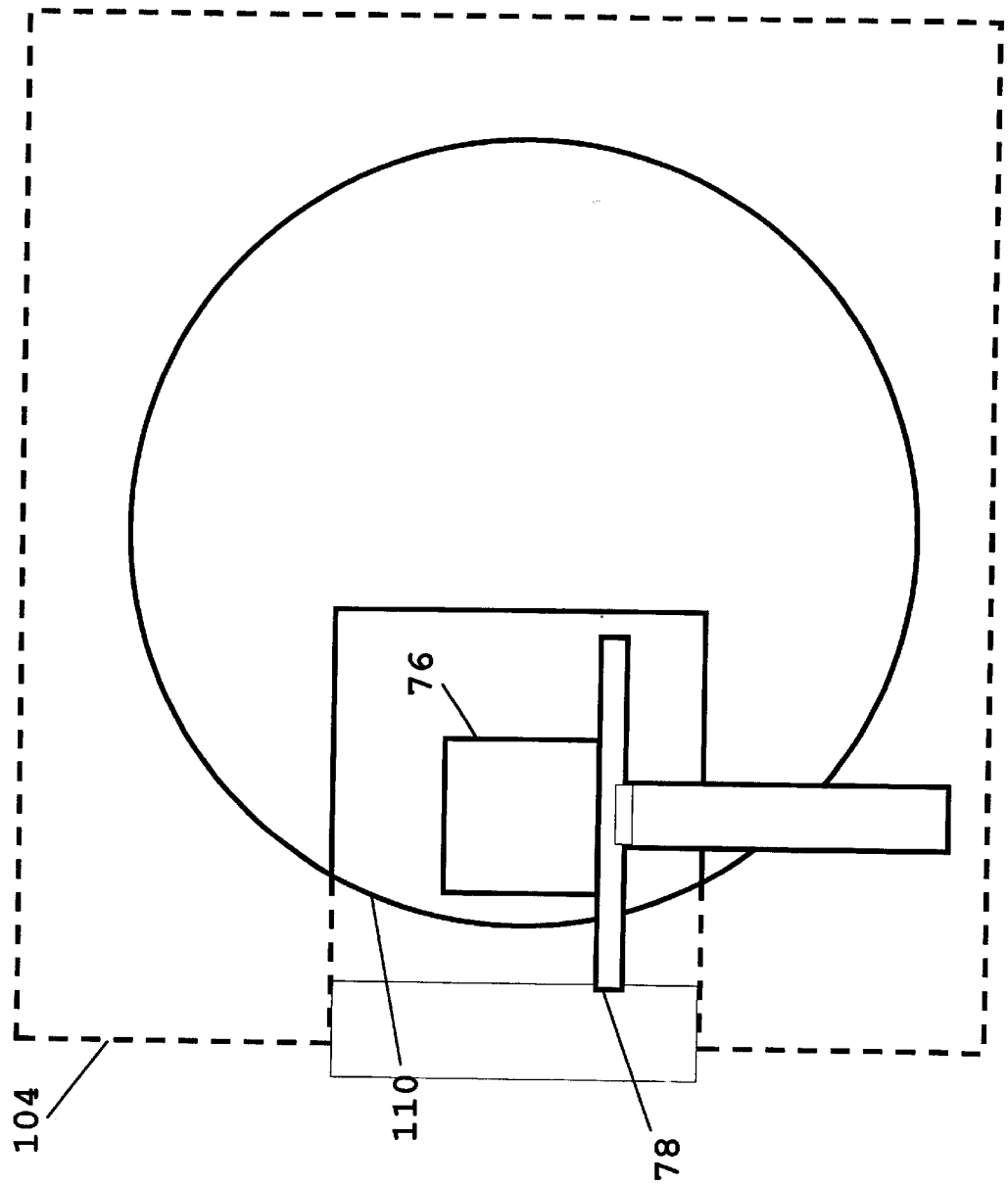
FIG. 4 is a schematic illustration of a front view of a portion of the preferred embodiment of the present invention shown in FIG. 3.

FIG. 4 shows a front-on diagram of the partial green filter 104. This is the view as seen looking into the aperture 110. Note that in this view, the green filter 104 is partly obscured (denoted by dashed lines in the figure) by the housing 72 so that only a portion of the green filter 104 is visible through the aperture 110. Note also that the filter is cut out so that it does not obscure the beamsplitter 76, nor does it obscure any of the nearby surrounding area of the beamsplitter 76. Note that the mounting post 78, to which the beamsplitter 76 is attached, is also shown in the figure. The reason for the green filter 104 (which covers most of the input aperture 110 except for the portion in the vicinity of the beamsplitter 76) is to block most of the red light out of the scene light, so that the scene appears greenish in tint. This way the only time that the user will see red light is if red light passes by the green filter without passing through it (all other red light is blocked by the green filter). By virtue of the nature of the principle of retro-reflection described in FIG. 2 above, the majority of red light that passes by the green filter 104 without passing through it will be retro-reflected light. Thus, the entire scene will appear green in color unless an imaging system is in the field of view. In that case, the imaging system will appear as a bright red spot to the user. This partial green filter acts to greatly improve the contrast and therefore the effectiveness of the invention. Once again, it is important to note that the color of the green filter 104 is provided as an illustrative example of a workable component within the present invention. Specifically, the color of the green filter 104 is chosen such that it does not transmit light from the on-axis illuminator, which illuminator in this case consists of a red laser diode module 80. It should be realized that the color and style of this filter can be varied and substituted for by a wide range of equivalents all within the spirit and scope of this invention. For example, a blue filter may be used instead of the green filter 104.

The reason for the polarizing filter 106 is threefold. First, the polarizing filter 106 keeps foreign objects (fingers, paper clips, dust, etc.) out of the housing. Second, the polarizing filter 106 makes it difficult to view the device interior and thus observe the components that make up the system, giving the package a more finished-looking outward appearance. Finally, the polarizing filter 106 allows all the laser light, which is polarized, to pass directly through it while only allowing a fraction of the scene light to pass through. This helps to make the retro-reflected laser light stand out from the background.

With the embodiment of FIG. 3, shiny objects (such as glass, metal, etc.) also reflect red light. One drawback with this preferred embodiment is that there are occasional false alarms, as some shiny objects also appear red. This one drawback is addressed and improved upon in the following further embodiments.

Further embodiments of the apparatus of the present invention are set forth below. In these embodiments, for clarity, common elements and components described in the various embodiments of this invention will be designated by identical reference numerals.

Figure 5:
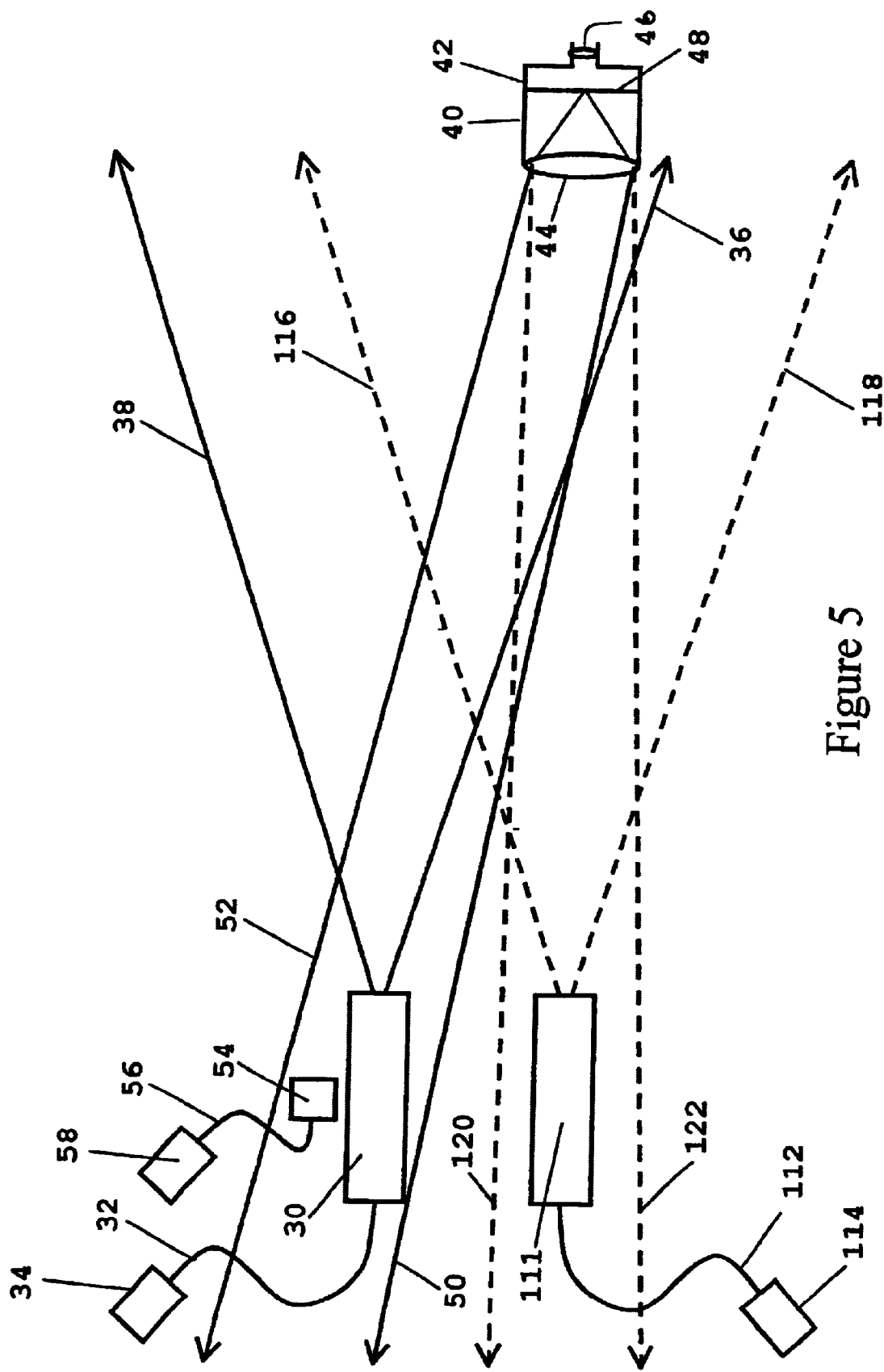
FIG. 5 is a schematic illustration of an alternative embodiment of the present invention.

As shown in FIG. 5, a second illumination output source 111, called an "off-axis illuminator" (which may or may not be connected, via optical and/or electronic means 112, to control electronics and/or optics 114), is present. The definition of an "off-axis illuminator" 111 is an illumination source that is "off-axis" (or "far away") from the optical receiving means 54. In practice, "off-axis" or "far away" means that there should be preferably about 4 cm of distance between the off-axis illuminator 111 and the optical receiving means 54 for every 3 meters of distance between the optical receiving means 54 and the target imaging system 40. This off-axis illuminator 111 has nearly the same direction of illumination as the first illumination output source 30. This off-axis illuminator 111 may emit light of the same electromagnetic wavelength(s) as or different electromagnetic wavelength(s) than the on-axis illuminator. An important factor is that the off-axis illuminator 111 be located enough of a distance away from the optical receiving means 54 so that significant retro-reflection (shown in FIG. 5 between rays 120 and 122) of its illumination is not seen by the optical receiving means 54 (see FIG. 5, and compare with FIG. 2). Thus when the on-axis illuminator 30 is turned on, the optical receiving means 54 will see not only retro-reflected light (between rays 50 and 52) from a target imaging system 40 but it will also see reflected light from other shiny objects. However, when only the off-axis illuminator 111 is turned on, the optical receiving means 54 will not be able to see the retro-reflected light from the target imaging system 40 (between rays 120 and 122), but it will see reflected light from other shiny objects.

Figure 6:
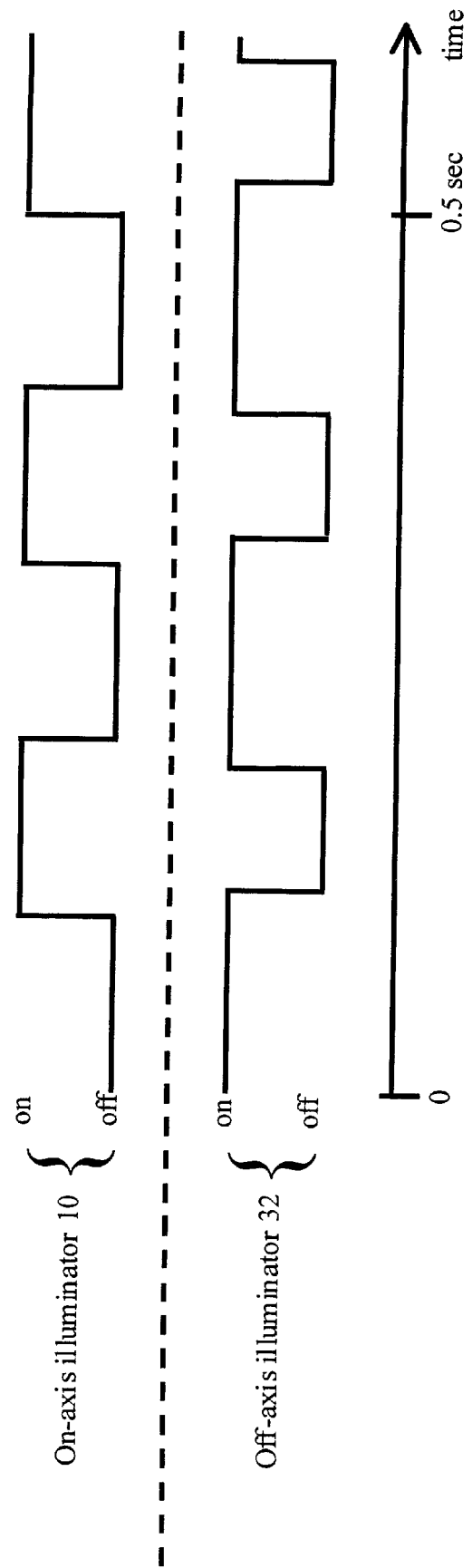
FIG. 6 is a graphic representations of an on-off cycle for illuminators used with the present invention.

The method of operation for this embodiment involves switching the on-axis illuminator 30 on and off, while either keeping the off-axis illuminator 111 on constantly or switching the off-axis illuminator 111 on and off in such a way that at least one of the two illuminators (30 and 111) is emitting at any given time. FIG. 6 gives an example of what the on/off cycle for the two illuminators might be. The key here is to switch the on-axis illuminator on and off at some frequency (preferably between 1 Hz and 10 MHz), while ensuring that at least one illuminator is emitting at all times. In this manner the detector will see the reflections from shiny objects as being constantly illuminated, while the retro-reflections from a target imaging system will appear to blink at the on/off switching frequency used to control the on-axis illuminator. Using this method, it is possible to eliminate false alarms (since reflected light from shiny objects will not blink), and ensure that target imaging systems stand out from the background (because retro-reflected light from target imaging systems will blink at the given frequency at which the on-axis illuminator is switched on and off). If electronic light-detection means are not used, then both the on-axis illuminator 30 and the off-axis illuminator 111 must emit radiation at any wavelength or range of wavelengths in the visible regime (0.4–0.7 microns) and must be pulsed at a frequency slower than 60 Hz in order to be visible to the user.

Also, a photodiode, a CCD array, or other opto-electronic photosensor may be used in the optical receiving means 54 or in its associated control optics and/or electronics 58. From the point of view of the optical receiving means 54, the on-axis illuminator 30 will produce target camera retro-reflection plus shiny object reflection, while the off-axis illuminator 111 will produce only shiny object-reflection. Therefore subtraction of the second signal from the first will yield only target camera retro-reflection. This can be done by electronically subtracting the photoelectric signal (which is received by the optical receiving means 54) when output from the off-axis illuminator 111 is pulsed from the photoelectric signal (which is received by the optical receiving means 54) when output from the on-axis illuminator 30 is pulsed. Since electronic light-detection means are used, the illuminators (30 and 111) may operate at any wavelength or range of wavelengths, including ultraviolet (0.1–0.4 micron), visible (0.4–0.7 micron), and infrared (0.7–15 micron).

Processing electronics may be used to produce as output to the user any combination of a visual display (a small TV screen, an indicator LED or lamp, or a series of indicator LEDs or lamps), an audible output (a beep, buzz, click, or tone), or recorded data.

Figure 7:
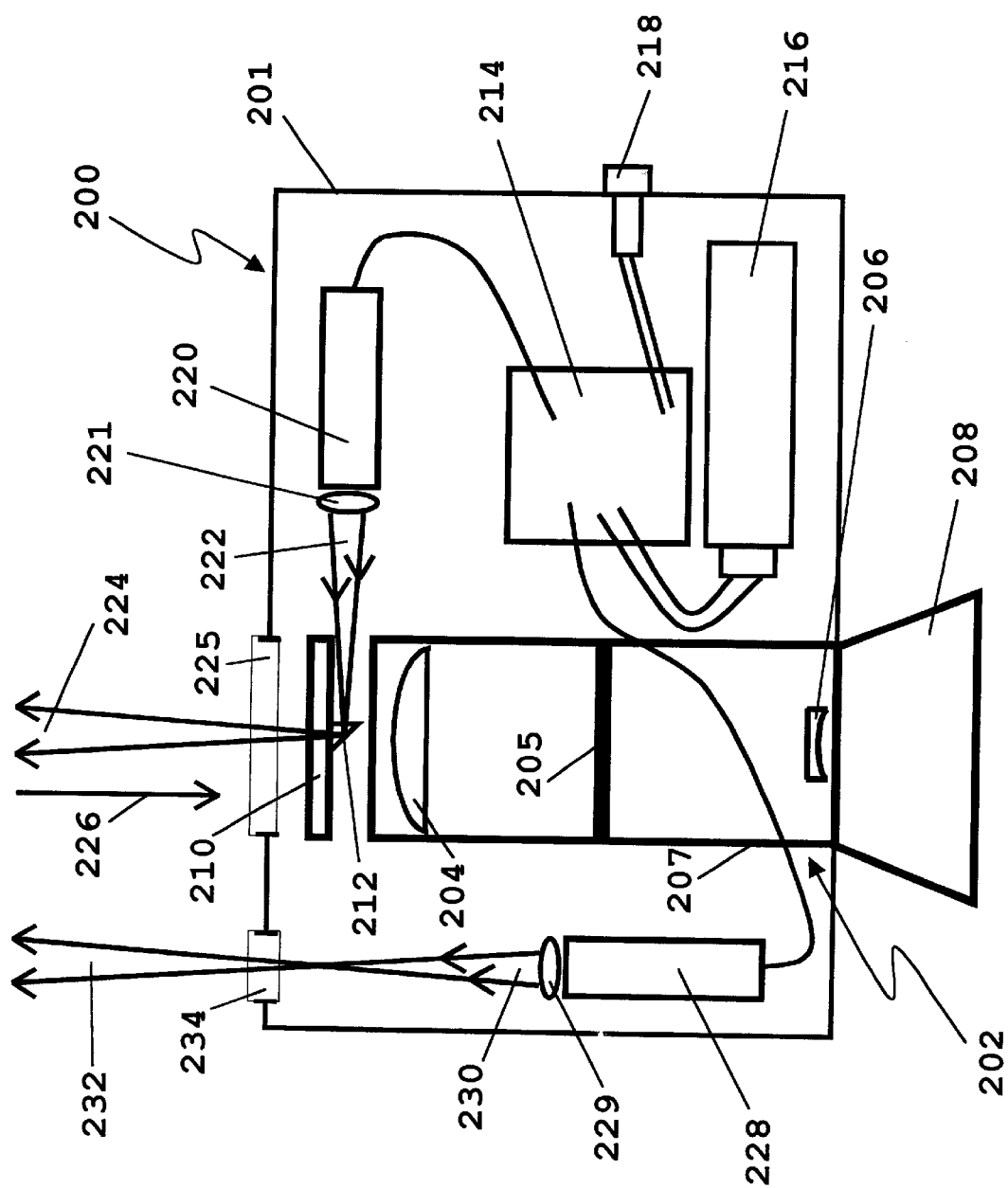
FIG. 7 is a schematic illustration of another preferred embodiment of the present invention.

FIG. 7 shows a schematic diagram of another preferred embodiment of the invention in the form of apparatus 200. All parts of apparatus 200 of the invention are contained within or connected to a housing 201, which in this case is preferably made of aluminum, but may be made of any durable material such as plastic, wood, or metal. A telescope 202 in the form, for example, of a miniature Galilean Telescope is mounted firmly to the housing 201. The Galilean Telescope 202 includes a positive lens 204, preferably a 25 mm diameter 100 mm focal length plano-convex lens (Edmund Scientific part #H32482), a linear polarizing filter 205 (Optosigma part #069-1105), which filter is oriented to maximize transmission of retro-reflected laser light 226, and a negative lens 206, preferably a 12 mm diameter 48 mm focal length plano-concave lens (Edmund Scientific part #H45019). All parts 204, 205, and 206 of the Galilean Telescope 202 are aligned with respect to one another inside a sturdy lens-mount tube 207. Attached to the end of the Galilean Telescope 202 is any suitable rubber eye-cup 208. Mounted in front of the other end of the Galilean Telescope 202 is a flat piece of clear glass 210, preferably a 1-inch diameter, 3.3 mm thick, anti-reflection coated float glass window (Edmund Scientific part #H46098) to which a small prism 212, preferably a 2 mm right-angle glass prism (Edmund Scientific part #H45524), has been affixed, preferably using a clear optical cement such as Norland Optical Adhesive 68 (Edmund Scientific part #H36427). Orientation of the prism 212 with respect to the glass window 210 and on-axis laser 220 is as shown in FIG. 7. Also mounted inside the housing 201 is an electronics board 214. Electronically connected via electrical wires to the electronics board 214 are the following components: a power source such as a battery 216, preferably 9 volts, on/off switch 218, on-axis laser 220, and off-axis laser 228.

Figure 8:
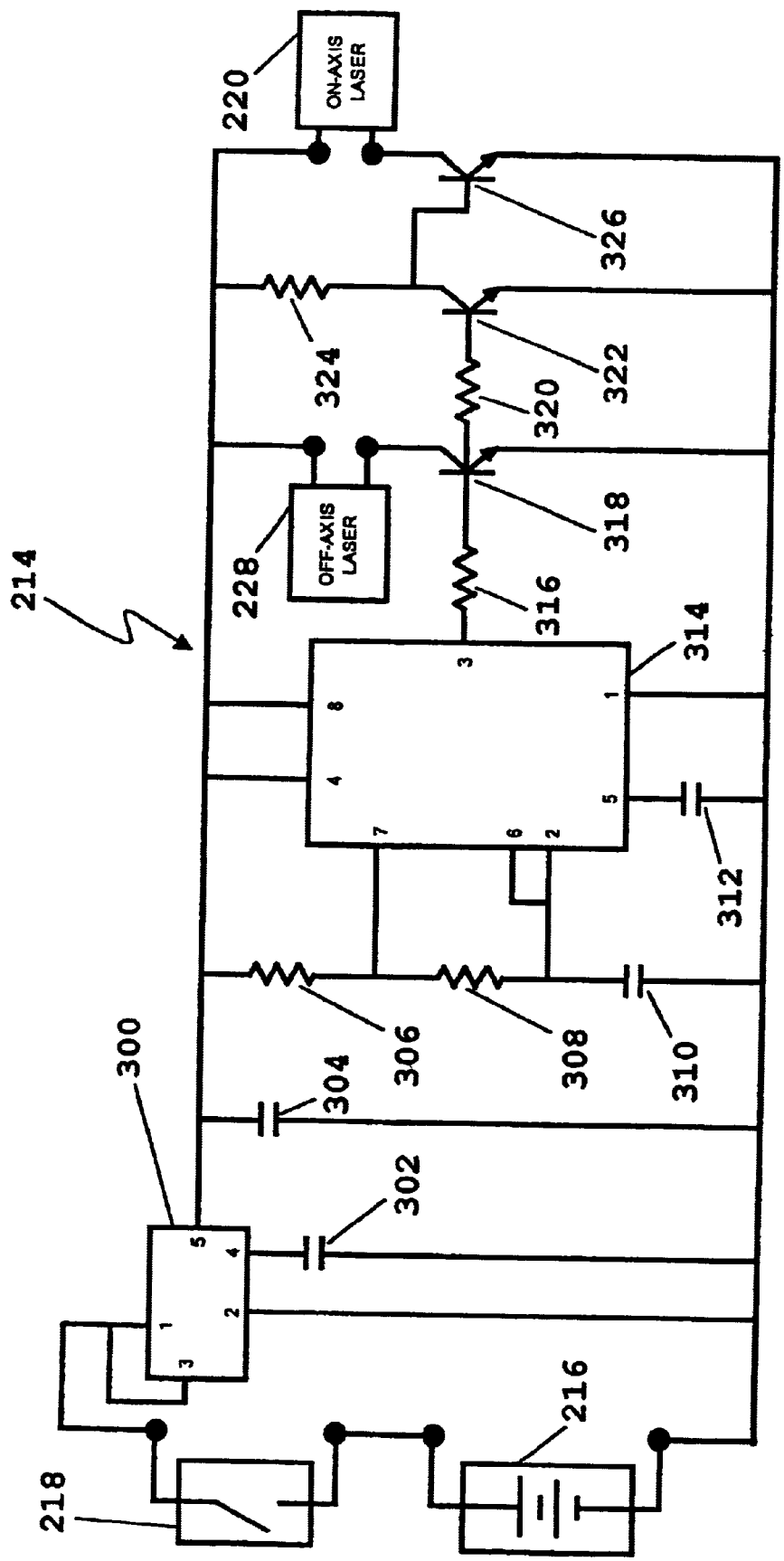
FIG. 8 is a schematic circuit diagram of the electronics used in the preferred embodiment of the present invention shown in FIG. 7.

A schematic circuit diagram for the electronics board 214 is shown in FIG. 8. An example of an electronics board 214 capable of being used with the present invention comprises, for illustrative purposes and not for limitations on the invention, the following electronic components, wired together as shown in the schematic circuit diagram shown in FIG. 8: MIC5205-5.0BM5 voltage regulator 300, 470 pF capacitor 302, 2.2 $\mu$F capacitor 304, 2.7 M$\Omega$ resistor 306, 432k$\Omega$ resistor 308, 100 nF capacitor 310, 10 nF capacitor 312, LMC555 timer IC chip 314, 2.21 k$\Omega$ resistor 316, MMBT2222 transistor 318, 1.0 k$\Omega$ resistor 320, MMBT2222 transistor 322, 2.21 k$\Omega$ resistor 324, and MMBT2222 transistor 326.

The above and following specific examples of components making up the apparatus 200 and electronics board 214 are provided as illustrative examples of workable components within the present invention. It should be realized that these components can be varied and substituted for by a wide range of equivalents all within the spirit and scope of this invention.

Figure 9:
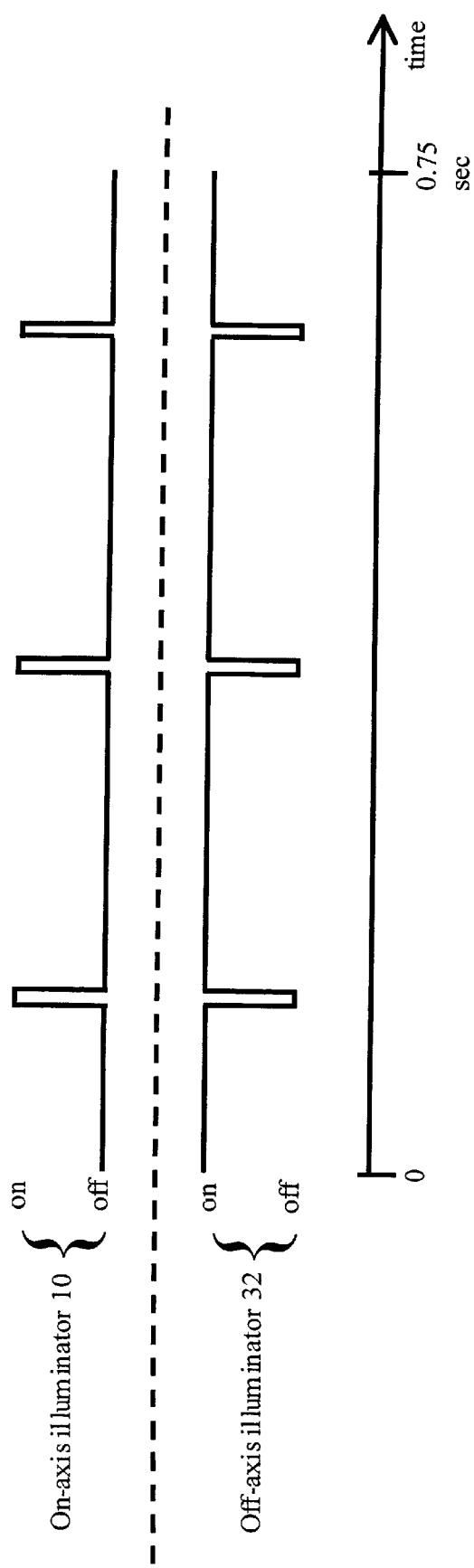
FIGS. 9 and 11 are graphic representations of on-off cycles for illuminators used with the present invention.

Also shown in FIG. 8 are the following examples of components used with this invention (which are electronically connected via electrical wires, as shown in the schematic diagram, to the electronics board 214): battery 216, preferably 9 volts, on/off switch 218, on-axis laser 220, and off-axis laser 228. The electronics board as shown will cause the on-axis laser 220 and the off-axis laser 228 to flicker alternately, with the on/off pattern of each laser as shown in FIG. 9. Thus, both the on-axis laser 220 and the off-axis laser 228 flicker at preferably 4 cycles/second. Also, when the on-axis laser 220 is on, the off-axis laser 228 is off and vice versa. Furthermore, the on-axis laser 220 is run at preferably a 10% duty cycle, while the off-axis laser 228 is run at preferably a 90% duty cycle. It is important to note that the above specific examples of flicker frequency and duty cycles for the on-axis laser 220 and the off-axis laser 228 are provided as illustrative examples of workable frequencies and duty cycles within the present invention. It should be realized that these frequencies and duty cycles can be varied over a wide range within the spirit and scope of this invention.

Figure 10:
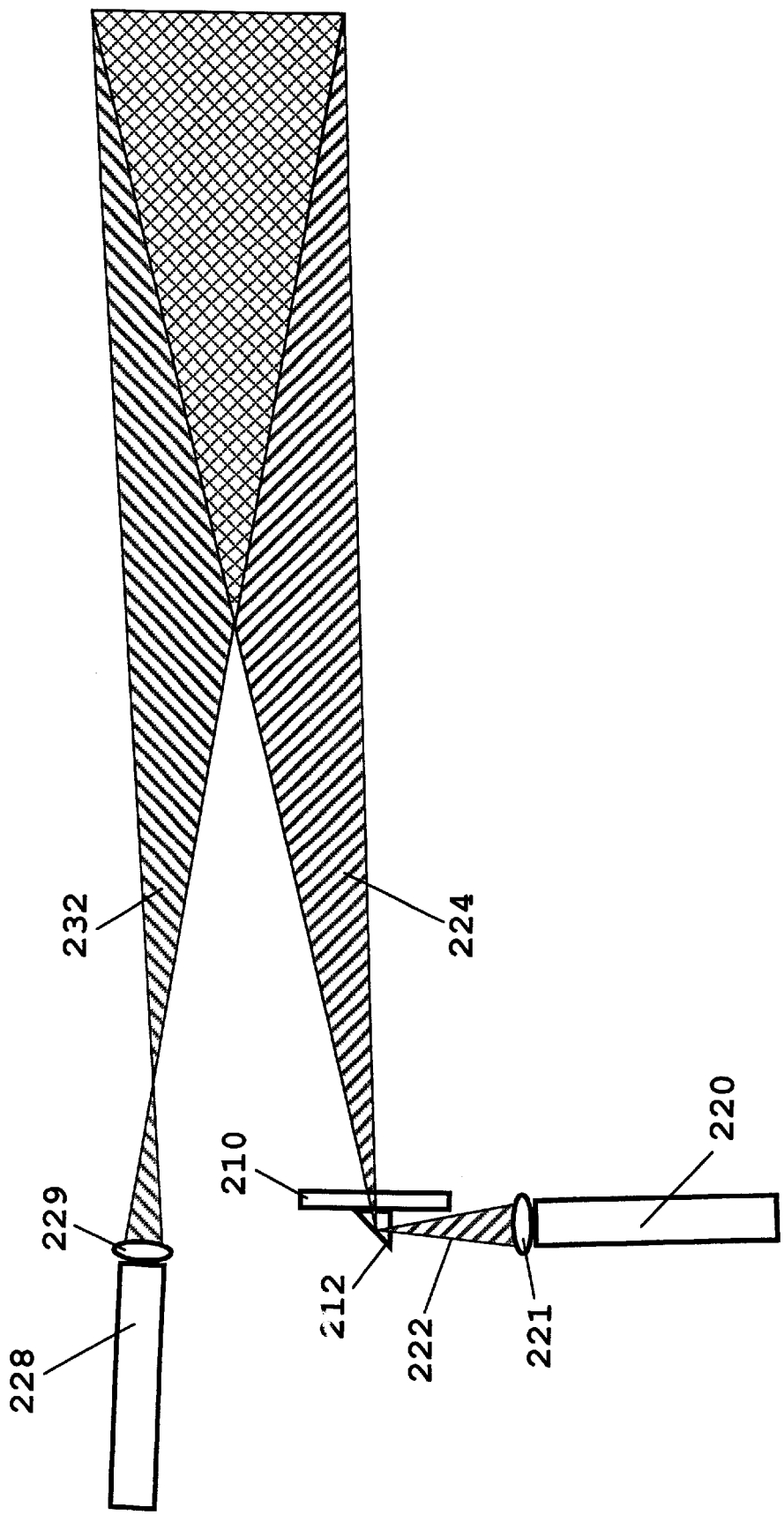
FIG. 10 is a schematic representation of the overlapping of beams within the present invention as shown in FIG. 7.

Referring again to FIG. 7, the on-axis laser 220 is preferably a 635 nm red laser diode module (Thorlabs part #CPS63AP05ME) with a positive lens 221, preferably a small, plastic asphere lens (Thorlabs part #CAX183), mounted on the front to properly focus the on-axis laser beam 222 onto the small prism 212 before allowing the beam 224 to diverge as it exits the housing 201 through the main aperture 225. It is important to note that although a red, 635-nm wavelength laser diode is described in this particular embodiment, the invention is not limited to any particular color, wavelength, or style of light source (laser, LED, lamp). The off-axis laser 228 is preferably identical to the on-axis laser 220. Thus the off-axis laser 228 is preferably a 635 nm red laser diode module (Thorlabs part #CPS63AP05ME) with a positive lens 229, preferably a small, plastic asphere lens (Thorlabs part #CAX183), mounted on the front to focus the off-axis laser beam 230 to allow an output beam 232 that is nearly identical to the output beam 224 from the on-axis laser 220. Laser beam light 232 from the off-axis laser 228 exits the main housing 201 through the secondary aperture 234. For best effect, the off-axis laser 228 is mounted so that its beam 232 emerges from the secondary aperture 234 almost parallel with the exiting beam 224 of the on-axis laser 220 such that at a preselected distance from the exiting beams the beams 224 and 232 overlap in order to ensure that an area is identically illuminated by both beams. More specifically and for purposes of illustration but not as a limitation on this invention, the two exiting beams 224 and 232 exit the housing 201 at points preferably, but not limited to, approximately 4 cm apart. Both the on-axis laser 220 and the off-axis laser 228 are oriented and made, with the addition of positive lenses 221 and 229, to diverge so as to fill the vertical field of view of the Galilean Telescope 202. Furthermore, the two lasers 220 and 228 are co-aligned so that their two laser beams overlap at a distance of about 10 feet from the apertures 225 and 234. FIG. 10 shows in exaggerated fashion a representation of the co-alignment of the two lasers 220 and 228, which co-alignment results in the overlap of the two laser beams at a distance of about 10 feet from the device.

Referring again to FIG. 7, retro-reflected laser light 226, along with light from the scene being viewed, enters the Galilean Telescope 202 through the main aperture 225 in the housing, and is detected in the same manner as through telescope 74 with respect to FIG. 3. It is again to be noted that the specific components set forth above are provided as working examples but may also be substituted for by equivalent components which fall within the purview of the present invention.

Figure 11:
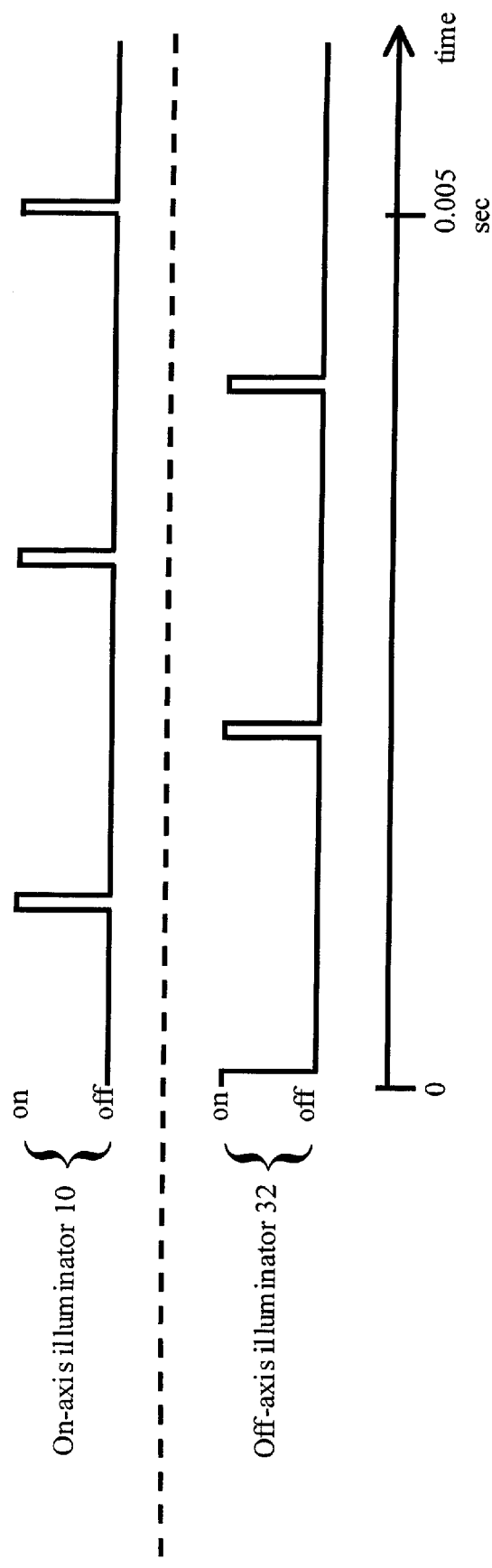

In a still further embodiment of this invention, alternating very short pulses from each of the two illuminators of the type described with respect to the embodiments of FIGS. 5 and/or 7 are used (instead of requiring that at least one of the two illuminators be on at any given time). FIG. 11 provides an example of a typical on/off cycle for the two illuminators. The object is to use light pulses that are so short as to be undetectable by either the human eye or by an electronic video camera (between 0.01 and 100 microseconds long). This way, use of the invention will be undetectable by the target imaging system 40. Referring to FIG. 5, the optical receiving means 54 and/or the control optics and/or electronics 58 in this case would include either a relatively fast-response photodetector or a CCD system that is set up to integrate the signal over many pulses (called a time-integrating CCD system). This results because a typical CCD array or human eye would not be able to detect the short pulses of the retro-reflected signal. To. prevent the time-integrating CCD system from saturating with normal room lights, a filter could be used that passes a very narrow band of wavelengths around the illumination wavelength.

The detection system would be able to distinguish between shiny object reflection and target camera retro-reflection in the same manner as described above. Since electronic light-detection means are used, the illuminator 30 may operate at any wavelength or range of wavelengths, including ultraviolet (0.1–0.4 micron), visible (0.4–0.7 micron), and infrared (0.7–15 micron). The output from the device would be similar to that described above.

A still further embodiment of this invention is also similar to the embodiment set forth in FIG. 5 and therefore FIG. 5 is also referred to with respect to the embodiment of the invention where the difference is the color or electromagnetic wavelength(s) of the off-axis illumination source 111. In this embodiment of the invention, the color or wavelength (s) of light from the two illumination sources 30 and 111 is different: for example, the off-axis source 111 may be green and the on-axis source 30 may be red. Both illumination sources may be left on continuously, without switching on and off. However, nothing precludes this embodiment from functioning if the illumination sources are switched on and off. With this modified arrangement of the embodiment shown in FIG. 5, the optical receiving means 54 will see reflected light from shiny objects from both the on-axis source 30 and the off-axis source 111, simultaneously. This red and green reflected light is additive and will appear to the optical receiving means 54 and/or its associated control optics and/or electronics 58 as yellow light. However, retro-reflected light from a target camera will appear to the optical receiving means 54 and or its associated control optics and/or electronics 58 as red light. This is because green retro-reflected light (which originated from the off-axis source 111) will follow the path between rays 120 and 122, and will not reach the optical receiving means 54. Meanwhile, red retro-reflected light (which originated from the on-axis source 30) will follow the path between rays 50 and 52, and will reach the optical receiving means 54. Thus, shiny reflective objects will appear yellow and retro-reflecting target imaging systems 40 will appear red to the optical receiving means 54 and/or its associated control optics and/or electronics 58. This apparent contrast can be enhanced with the use of a yellow filter (not shown) in front of the optical receiving means 54 and/or before the associated control optics 58. This way, the background scene will appear yellow, shiny reflective objects will appear bright yellow, and retro-reflecting target imaging systems 40 will appear very bright red.

If electronic light-detection means are not used, the illuminator 30 must operate at any wavelength or range of wavelengths in the visible regime (0.4–0.7 microns) in order to be visible to the user. If electronic light-detection means are used, then the illuminator 30 may operate at any wavelength or range of wavelengths, including ultraviolet (0.1–0.4 micron), visible (0.4–0.7 micron), and infrared (0.7–15 micron).

Figure 12:
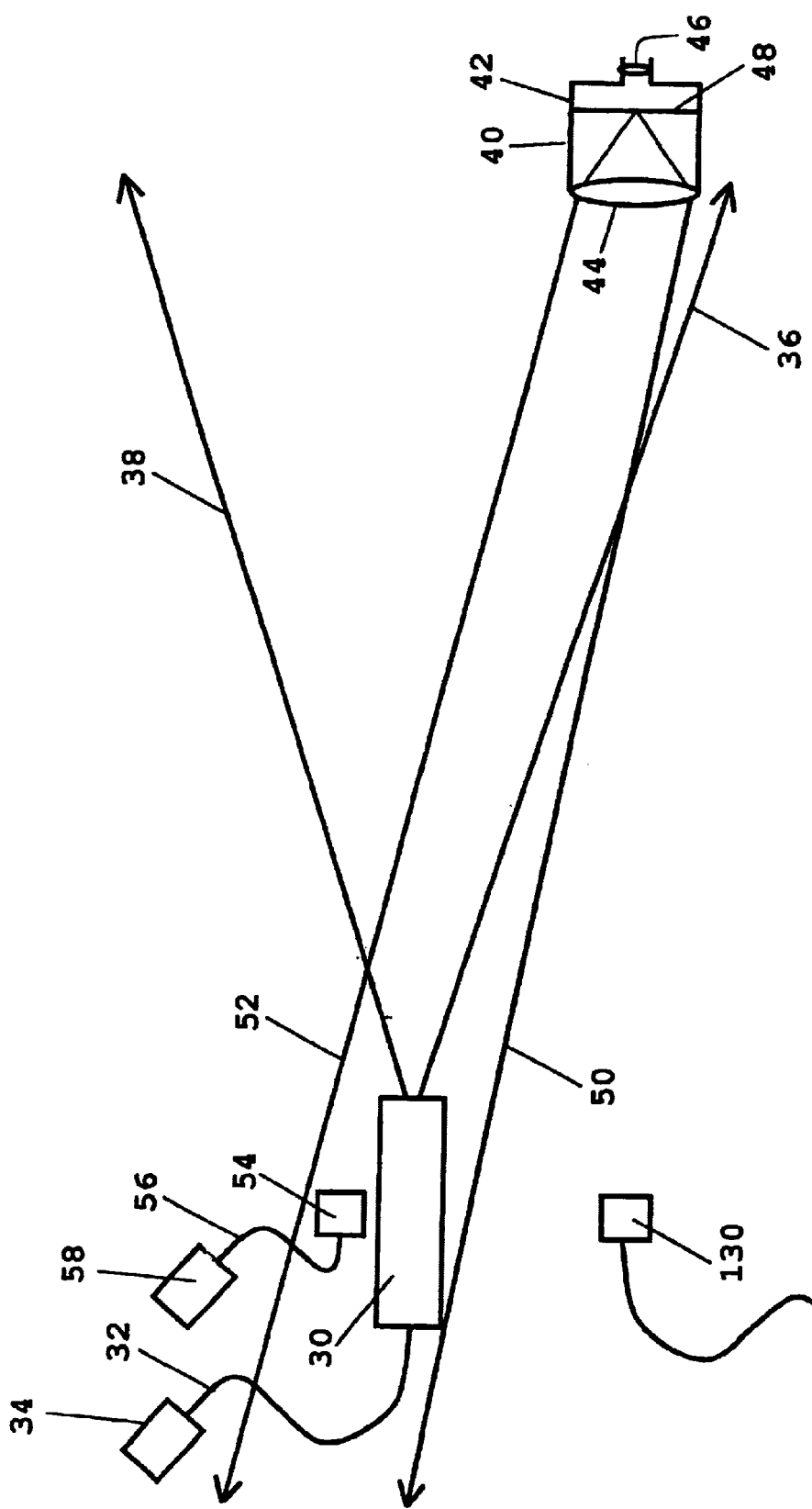
FIG. 12 is a schematic illustration of another embodiment of the present invention.

FIG. 12 shows a schematic diagram of an even further embodiment of this invention. FIG. 12 shows the addition of (second) optical receiving means 130 (called the off-axis optical receiving means), which may or may not be connected via optical and/or electronic means 132 to control electronics and/or optics 134, to the setup shown in FIG. 2. This way, the off-axis optical receiving means 130 is able to see reflections from shiny objects, but is not able to see target camera 40 retro-reflection, which is confined to the area between ray 50 and ray 52. However, the on-axis optical receiving means 54 is able to see both shiny object reflections and target camera 40 retro-reflection. By using a binocular imaging system for the two optical receiving means 54 and 130, the user would see the same background image in both eyes, the same shiny object reflection in both eyes, but would see target camera 40 retro-reflection in only one eye. For example, if the left tube of a pair of binoculars were used as the on-axis optical receiving means 54, and the right tube of the same pair of binoculars were used as the off-axis optical receiving means 130, then the user would see the background image and shiny object reflections in both his left and right eyes. But the user would see target camera retro-reflections in only his left eye. This improvement would help the user distinguish between target camera retro-reflection and shiny object reflection. If electronic light-detection means are not used, the illuminator 30 must operate at any wavelength or range of wavelengths in the visible regime (0.4–0.7 microns) in order to be visible to the user.

Furthermore, by using electronic light-detection means (such as a photodiode, a CCD array, or some other optoelectronic photosensor) in optical receiving means 54 and 130 and/or their associated control optics and/or electronics 58 and 134, it will again be possible to subtract the off-axis optical receiving means's 130 electronic signal from the on-axis optical receiving means's 54 electronic signal, to result in only the signal received from retro-reflected target camera light, as described previously. Since electronic light-detection means are used, the illuminator 30 may operate at any wavelength or range of wavelengths, including ultraviolet (0.1–0.4 micron), visible (0.4–0.7 micron), and infrared (0.7–15 micron). Once again as before, the output may be visual, audible, or recorded data, as described previously.

An even further embodiment utilizes short pulse illumination in conjunction with the embodiment of FIG. 12. The short pulses (see FIG. 11) are used to evade detection by the target camera. Also, the optical receiving means 54 and 130 and/or their associated control optics and/or electronics 58 and 134 must include either a relatively fast-response photodetector or a long-time-integrating CCD, since a typical CCD array or human eye would not be able to detect the short pulses of the retro-reflected signal. Since electronic light-detection means are used, the illuminator 30 may operate at any wavelength or range of wavelengths, including ultraviolet (0.1–0.4 micron), visible (0.4–0.7 micron), and infrared (0.7–15 micron). The photodetectors would be able to distinguish between shiny object reflection and target camera retro-reflection by subtracting the signal seen by the off-axis optical receiving means 130 from that seen by the on-axis optical receiving means 54. The output from the device would be visual, audible, or recorded data, as described previously.

If electronic light-detection means are not used, the illuminator 30 must operate at any wavelength or range of wavelengths in the visible regime (0.4–0.7 microns) in order to be visible to the user. If electronic light-detection means are used, then the illuminator 30 may operate at any wavelength or range of wavelengths, including ultraviolet (0.1–0.4 micron), visible (0.4–0.7 micron), and infrared (0.7–15 micron).

Figure 13:
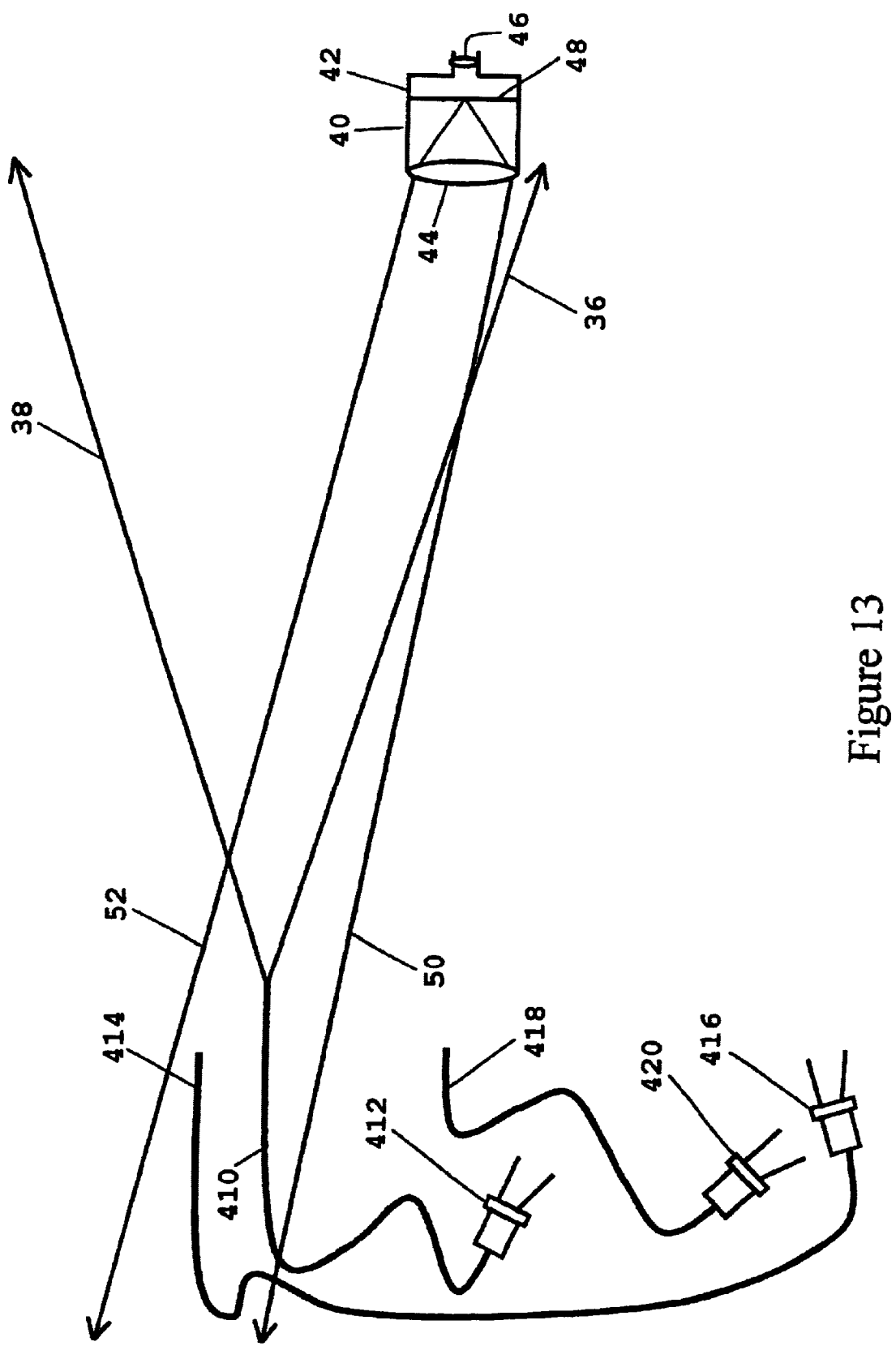
FIG. 13 is a schematic illustration of a further embodiment of the present invention.

Another embodiment of the present invention utilizes optical fibers as part of either the illumination source or the detection system, or both. An example of such system is shown in FIG. 13. In this example, the illumination system 30 from FIG. 12 is replaced by a light source 412 (such as a laser diode, LED, incandescent lamp, etc.) connected to an optical fiber 410. The optical fiber illuminates an area bounded by rays 36 and 38, as before in FIG. 12. The return illumination is detected by a pair of fibers. An on-axis fiber 414 couples light to a photosensor 416 and thus acts in a manner similar to the on-axis optical receiving means 54 described above. Finally, an off-axis fiber 418 couples light to a separate photosensor 420 and thus acts in a manner similar to the off-axis optical receiving means 130 described above and shown in FIG. 12. Operation of this device would otherwise be exactly as described with respect to the embodiment shown in FIG. 12, with the illumination output source 30 replaced by laser 412 and fiber 410, the on-axis optical receiving means 54 replaced by fiber 414 and photosensor 416, and the off-axis optical receiving means 130 replaced by fiber 418 and photosensor 420.

Figure 14:
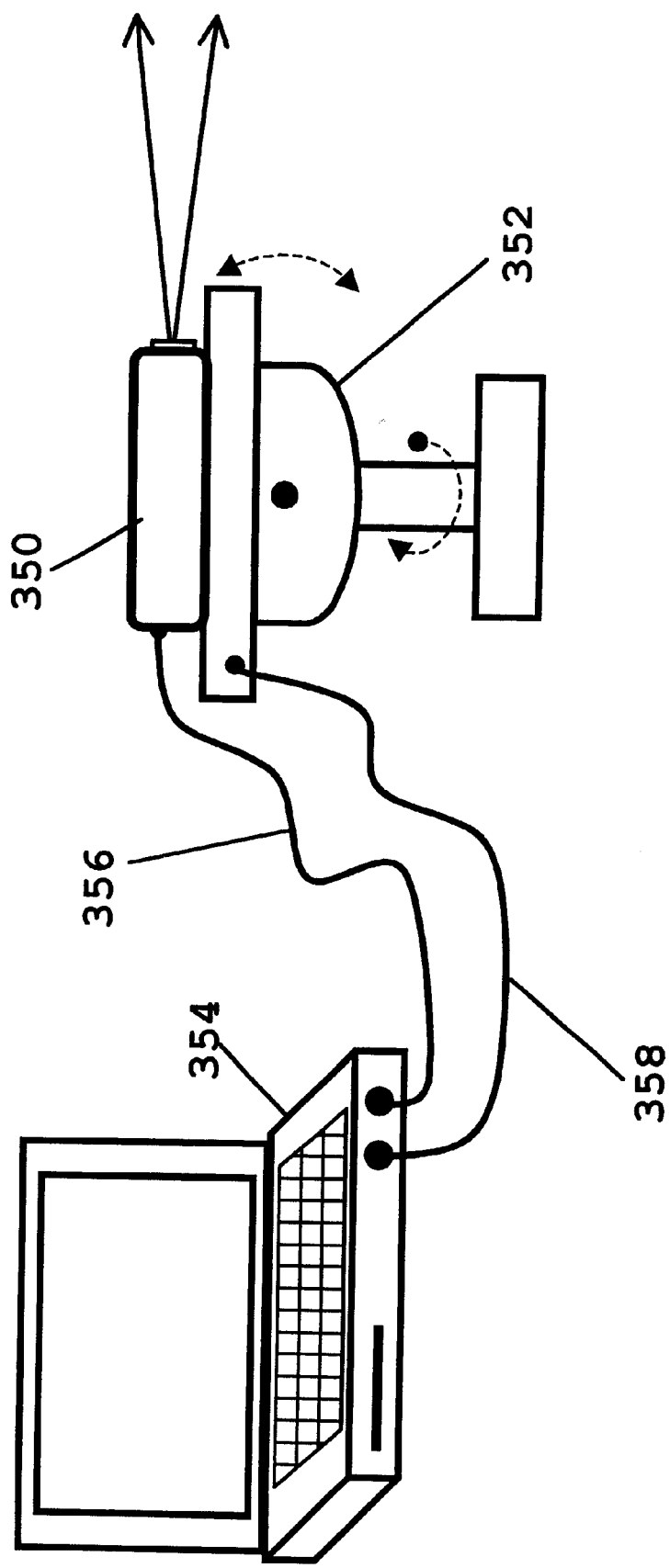
FIG. 14 is a pictorial schematic representation of a further embodiment of the present invention.
Figure 15:
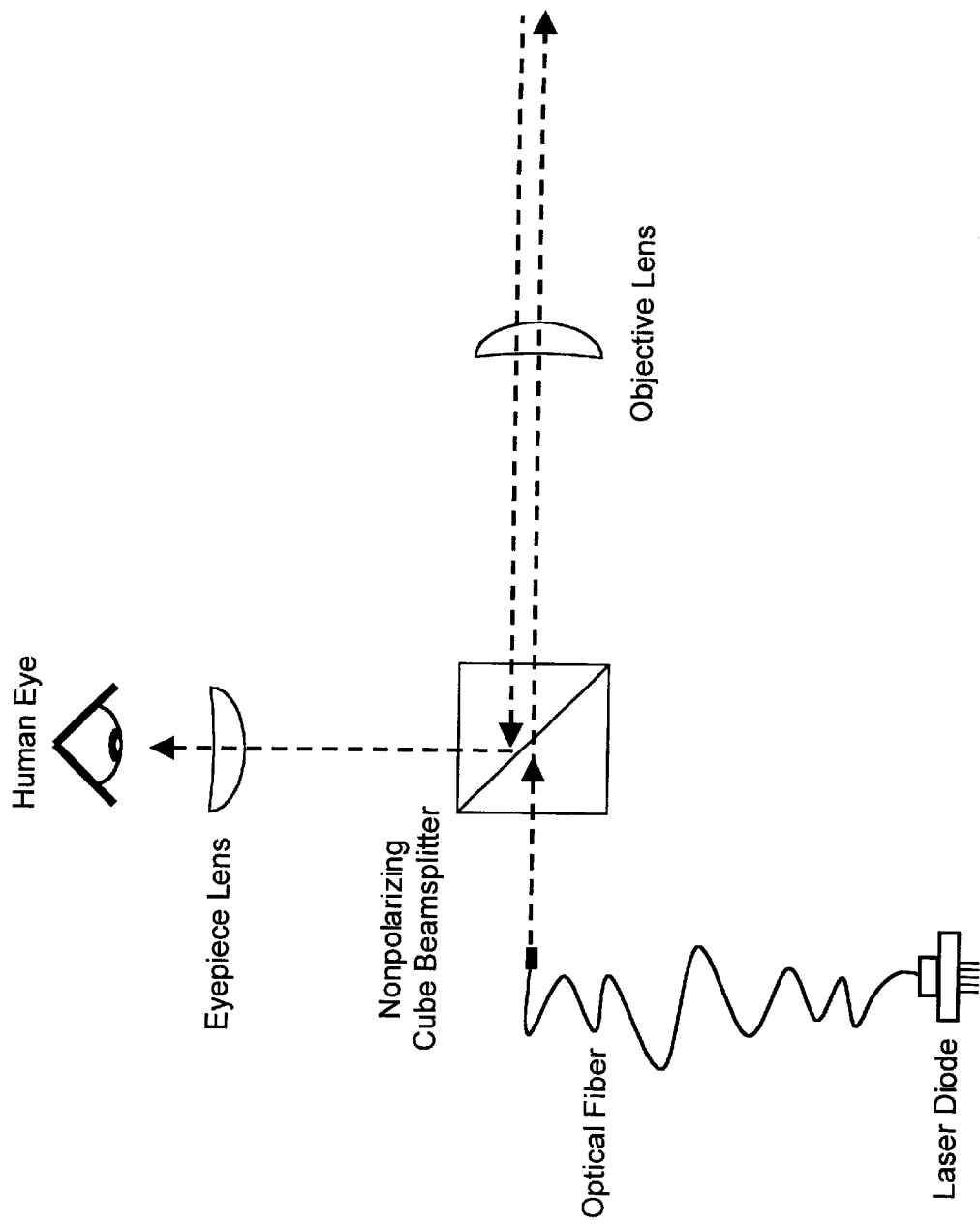
FIGS. 15–26 represent schematic illustrations of further embodiments and possible variations of the illuminator/detector systems used within the present invention.
Figure 16:
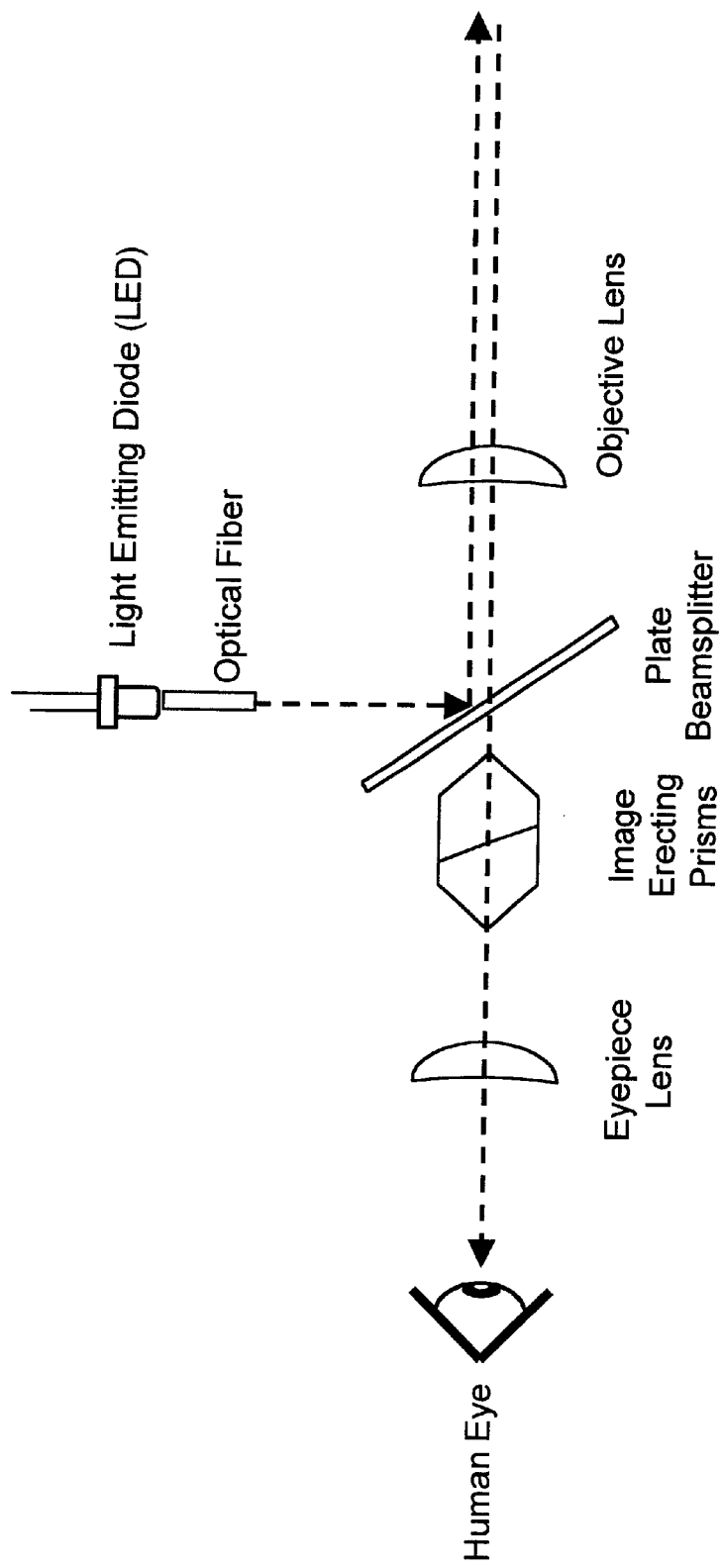
Figure 17:
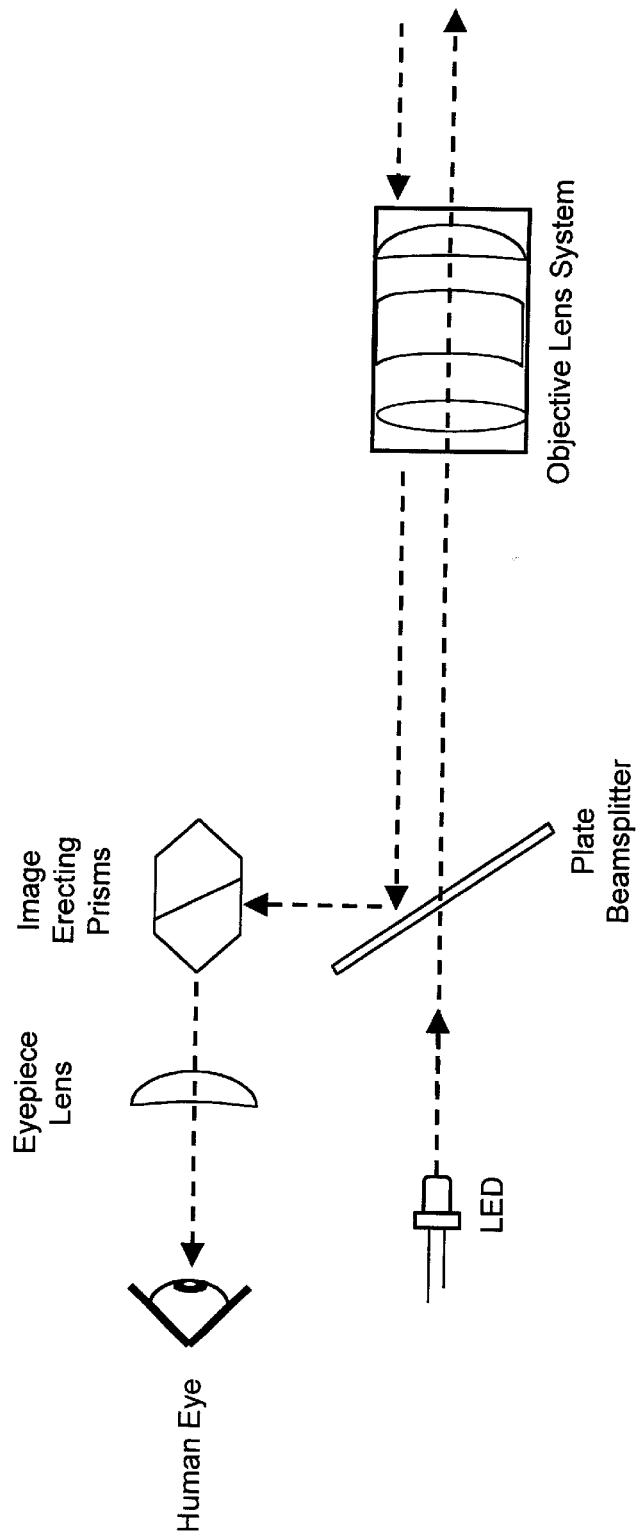
Figure 18:
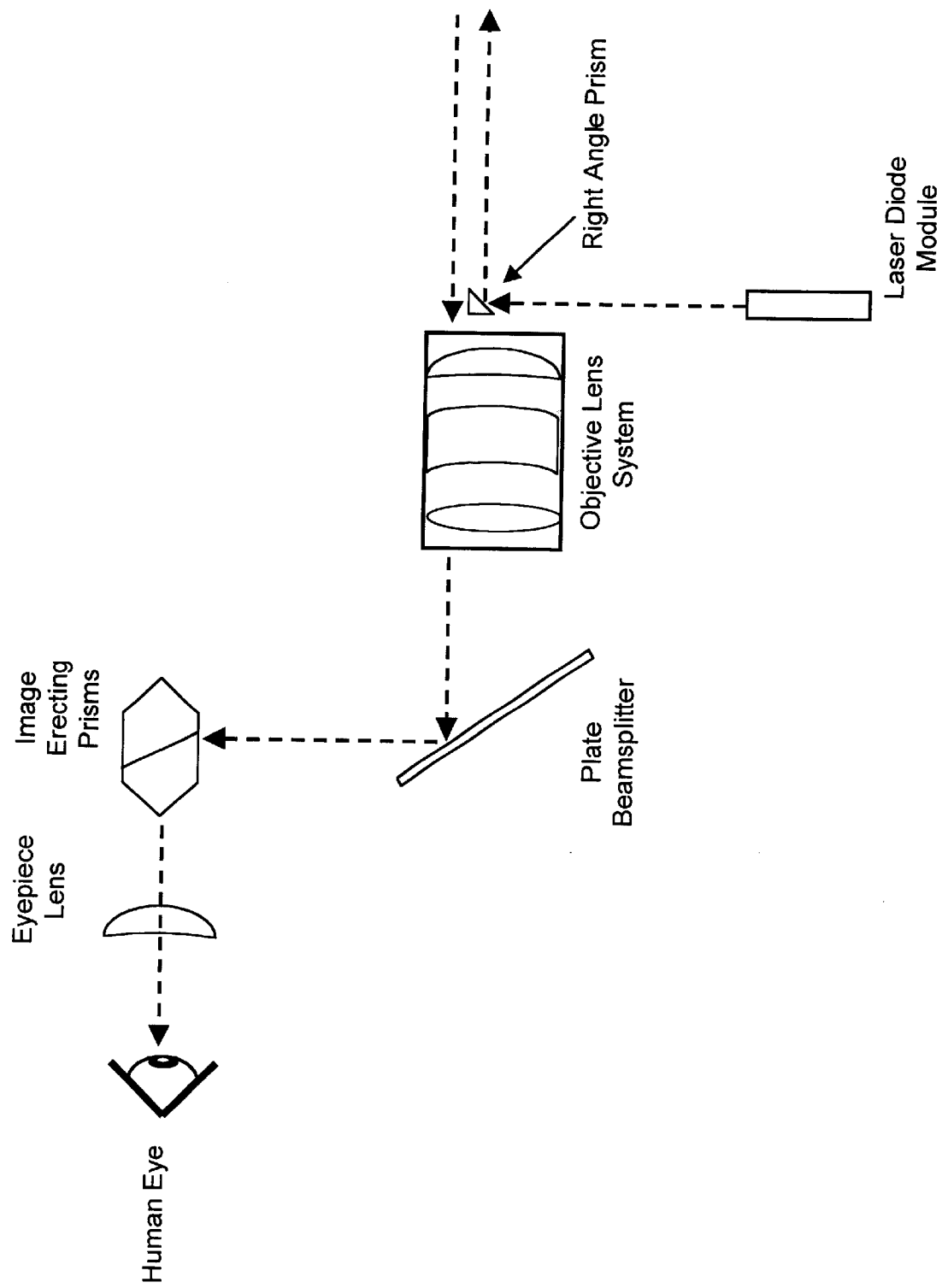
Figure 19:
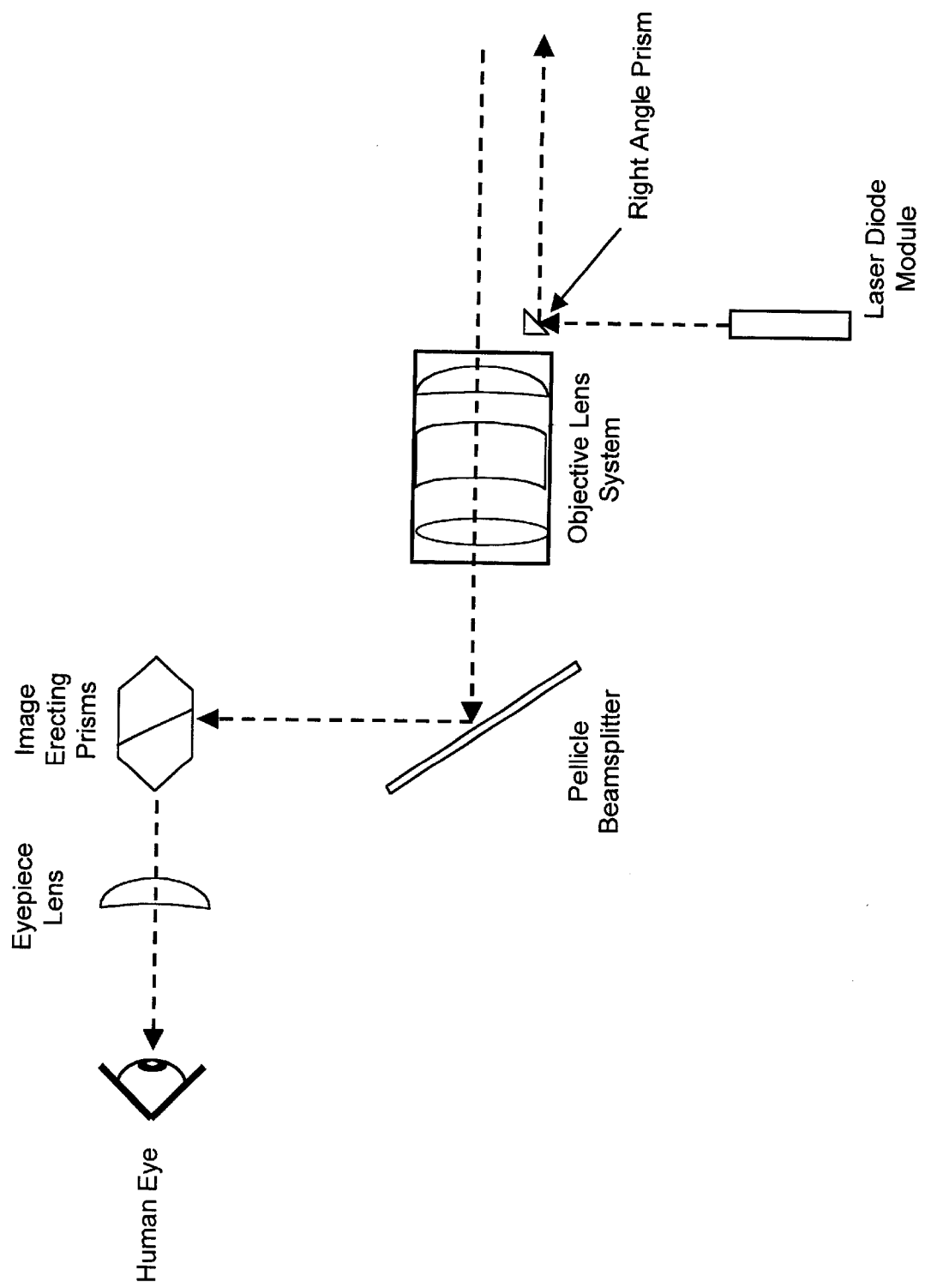
Figure 20:
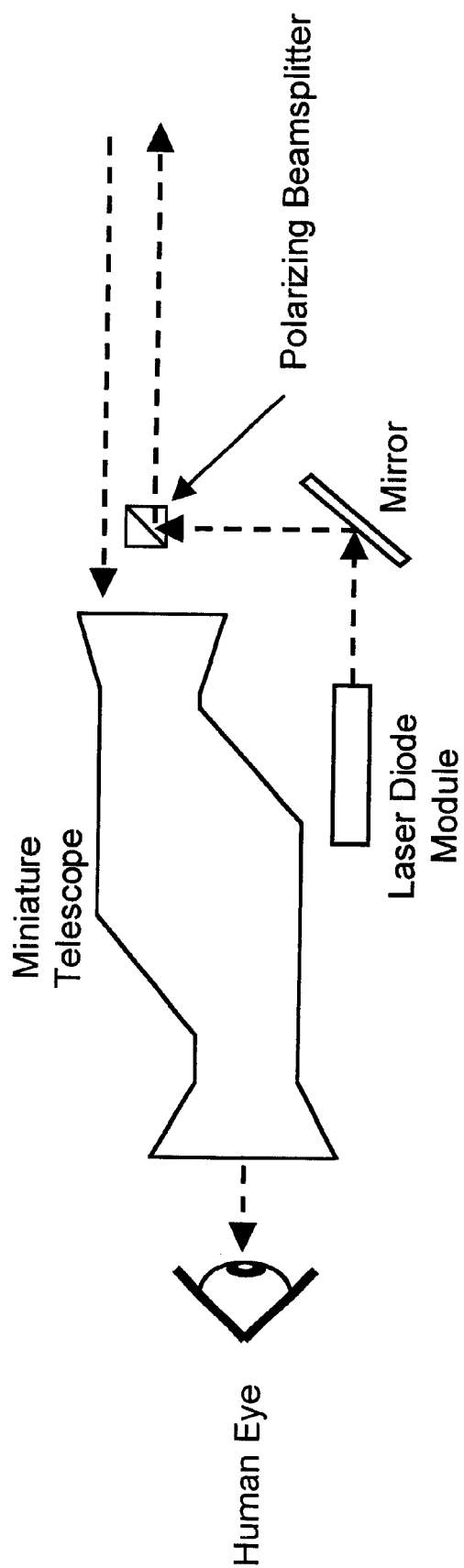
Figure 21:
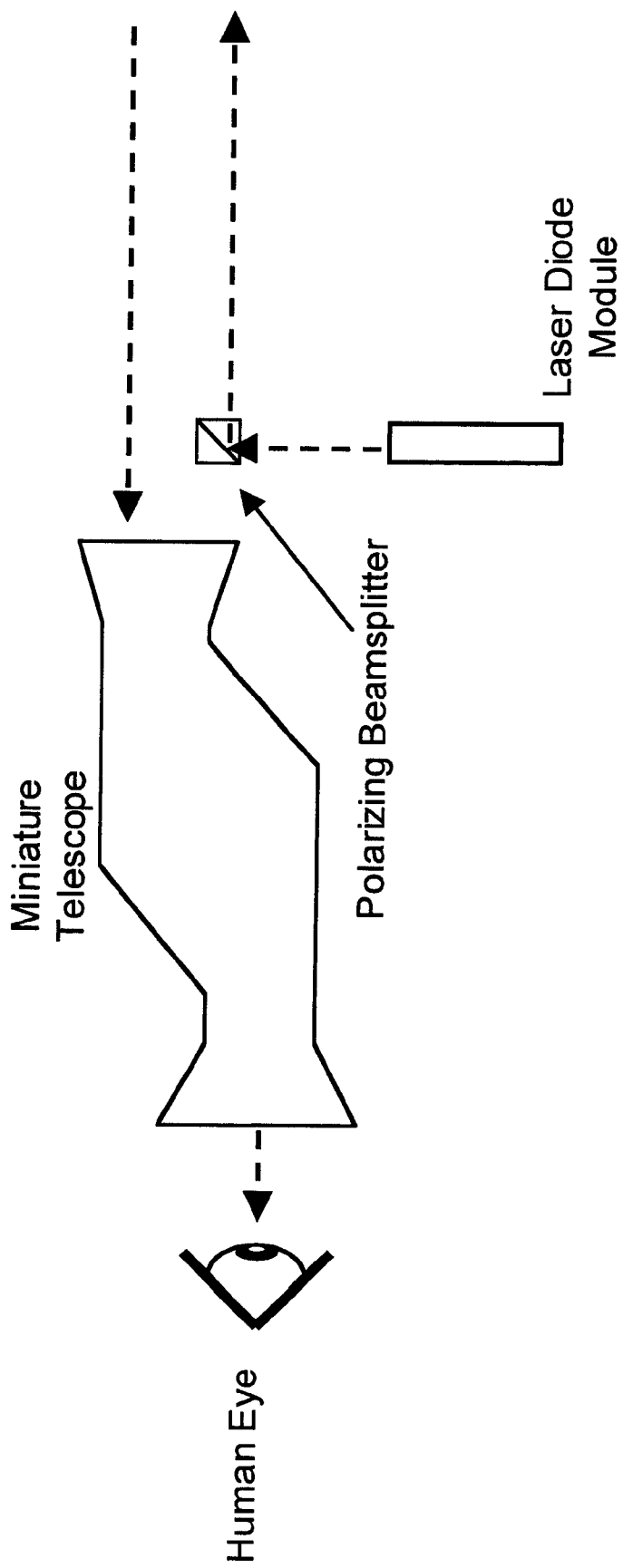
Figure 22:
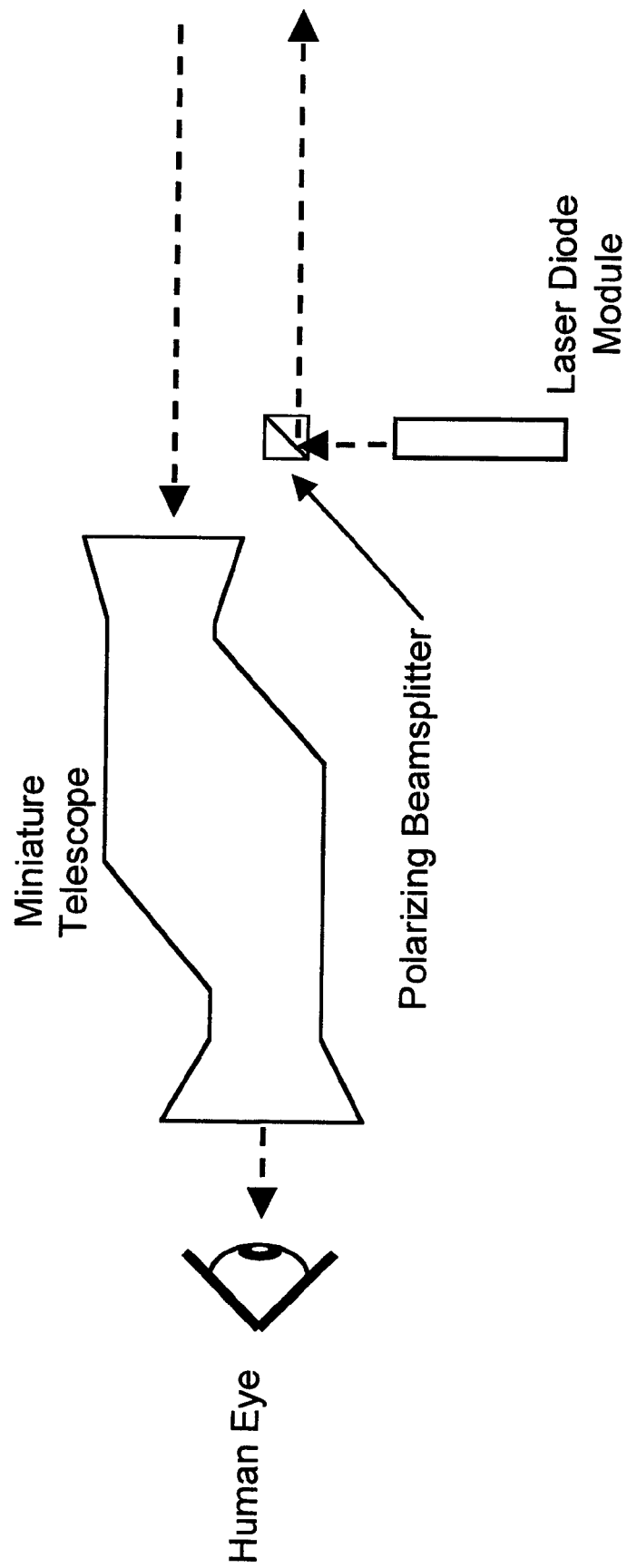
Figure 23:
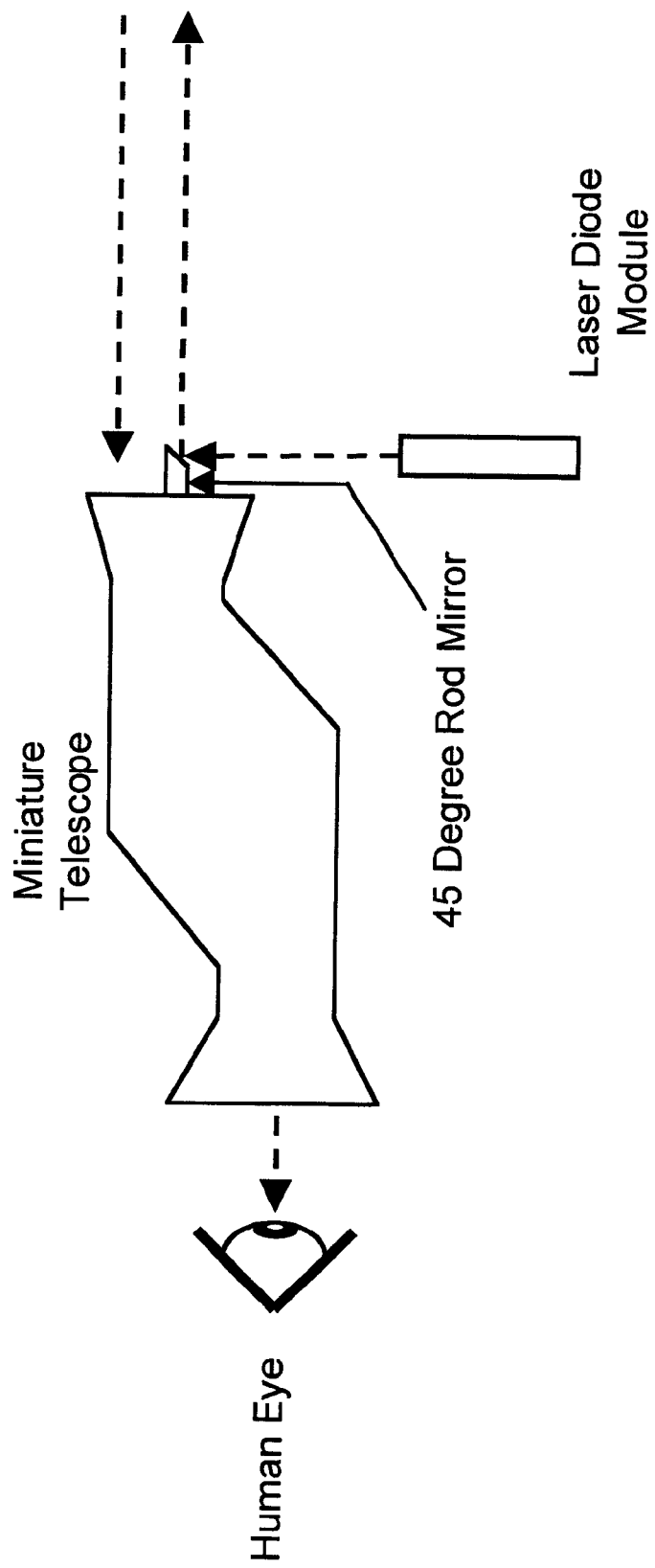
Figure 24:
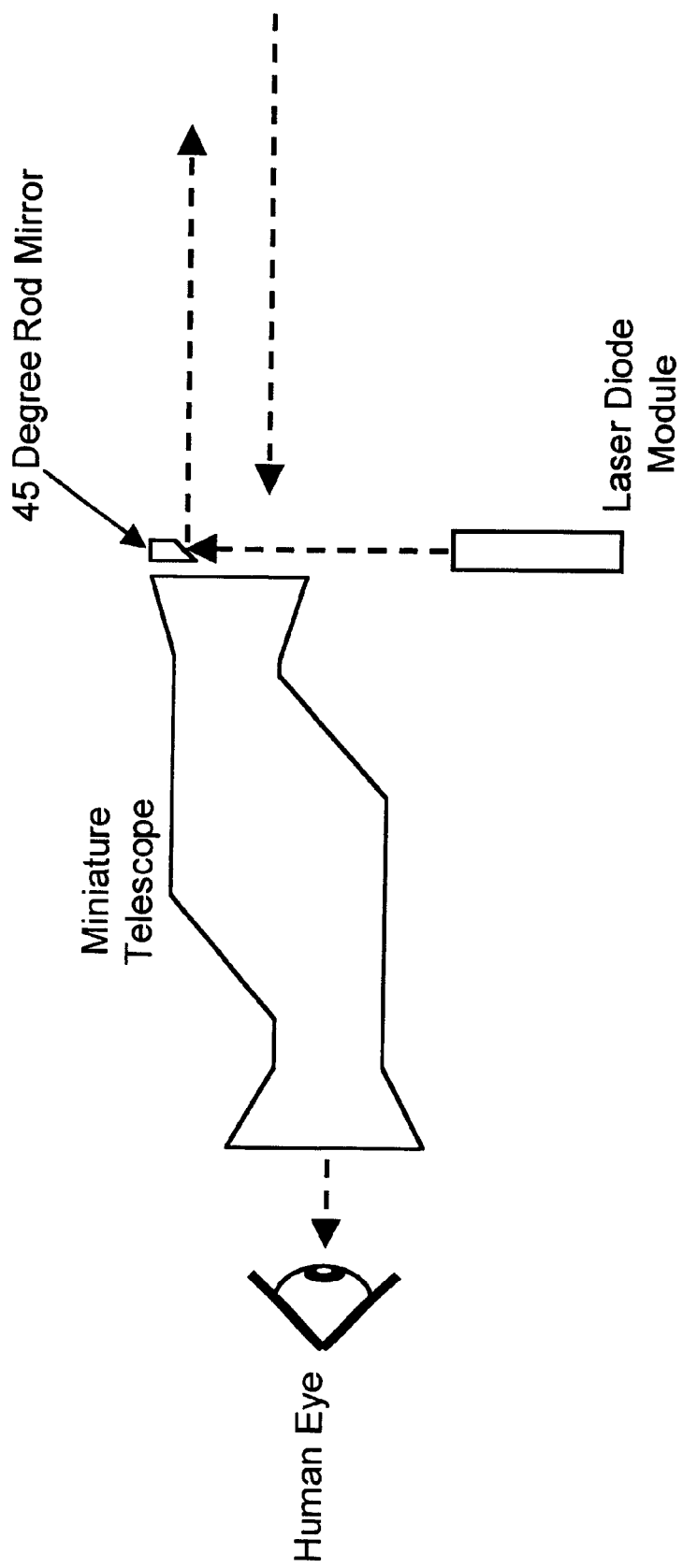
Figure 25:
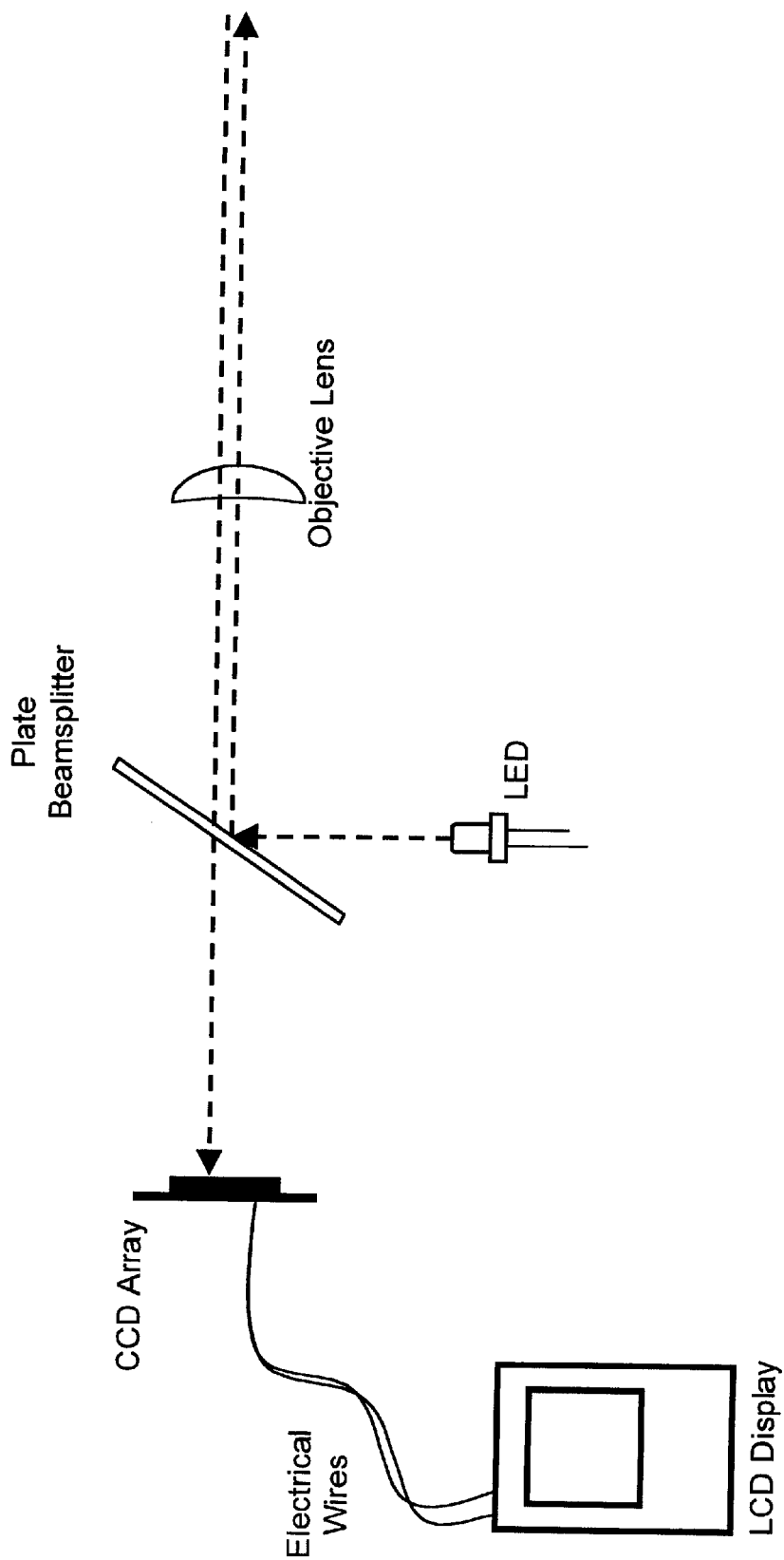
Figure 26:
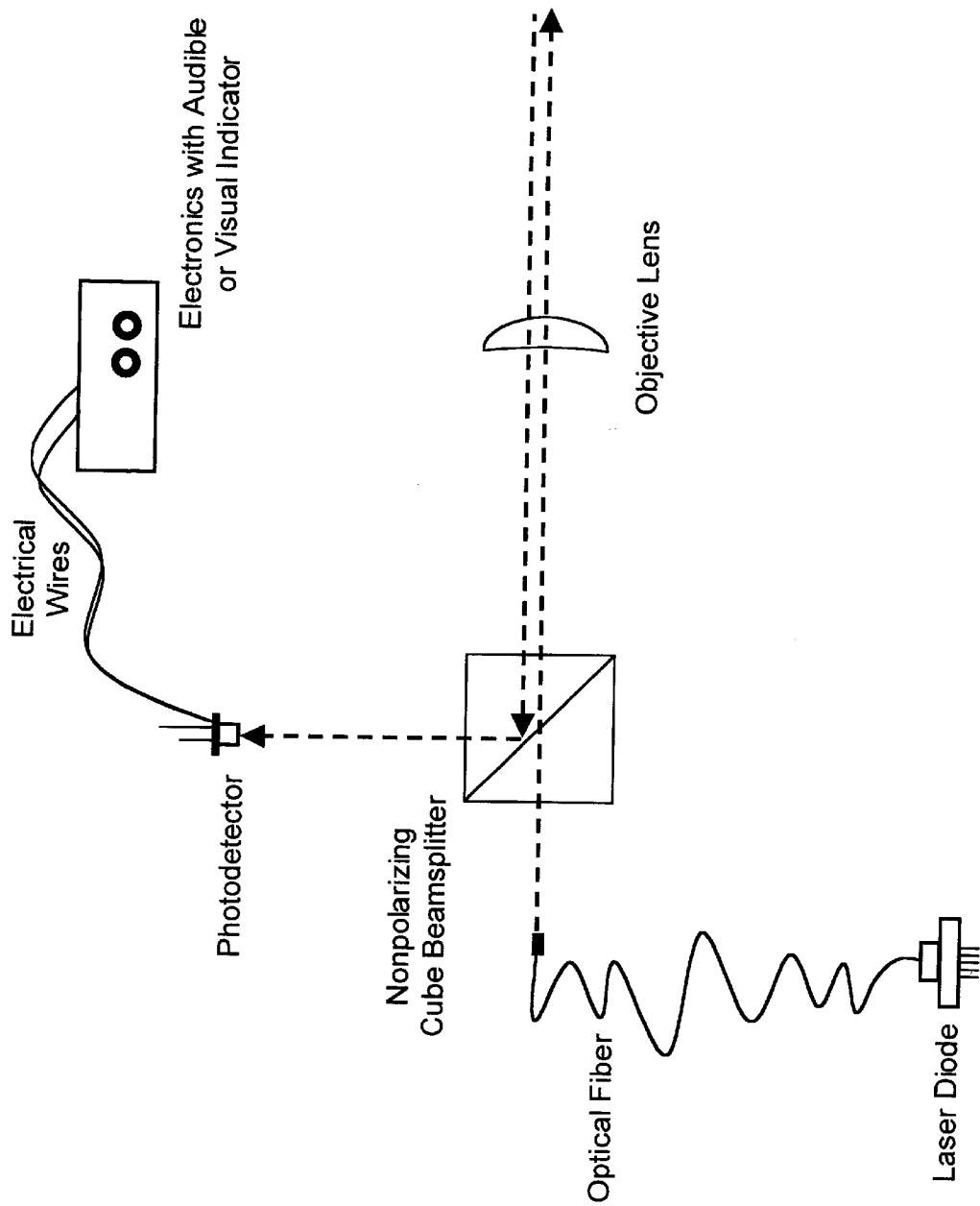

A still further embodiment uses some form of automated or semi-automated scanning action in conjunction with any of the above embodiments that involves use of detection by an electronic means. The concept presented in this embodiment is to have the device automatically scan a room and give feedback to the user in the form of a visual display, and audible report, or recorded data as to the location and/or presence of hidden cameras. One possible way to create the scanning action would involve the use of a motorized, computer-controlled pan/tilt device, as found in typical camera equipment. FIG. 14 shows an example of this embodiment. In this embodiment, a housing 350 is firmly attached to a motorized pan/tilt device 352. Any of the previously-described embodiments (such as those shown in FIG. 2, FIG. 3, FIG. 5, FIG. 7, FIG. 12, or FIG. 13) may be contained inside the housing 350. An electrical cable 358 connects the pan/tilt device 352 to a computer 354. An electrical and/or optical cable 356 connects the housing 350 to computer 354. The computer 354 and pan/tilt device 352 act together, as a standard computer-controlled pan-and-tilt system, to effect panning and tilting motion of the housing 350. Connection of the housing 350 to the computer 354, via an electrical and/or optical cable 356, allows the computer access to data obtained by the embodiment of the present invention contained within the housing 350.

Although the invention has been described with respect to various embodiments, it should be realized this invention is also capable of a wide variety of further and other embodiments within the spirit and scope of the appended claims. For example, other embodiments of this invention include the following improvements: One allows the user the ability to change the angle of output from the illumination system. This improvement can be used in conjunction with any of the previous embodiments. This concept is based upon moving an aperture, a mirror, a lens, or any combination or number of these items, in order to change the angle of illumination, and therefore the area of illumination. For example, a zoom lens may be used in front of the illumination system. This embodiment will allow the user to focus the illumination beam on a smaller area without having to walk up closer to the target camera. One reason this may be important is to prevent the target camera operator from knowing that the present invention has located the target camera.

Another embodiment involves the detection system being equipped with the ability to change its field-of-view. This embodiment can be used in conjunction with any of the previous embodiments as well. The idea behind this concept is that by moving an aperture, a mirror, a lens, or any combination or number of these items, the angle of detection, and therefore the area over which target cameras will be detected, can be changed. For example, a zoom lens may be used in front of (or incorporated into) the telescope shown in, for example, FIG. 3. This improvement will allow the user to close in on a smaller area without having to walk up closer to the target camera. One reason this may be important is to prevent the target camera operator from knowing that the present invention has located the target camera.

A still further embodiment permits the system of this invention to work specifically at very long ranges (between 25 and 500 meters). Important aspects about a long-range system are that the angle between rays 36 and 38 of FIG. 2, for example, will be very small, and the angle between rays 116 and 118 of FIG. 3, for example, will also be very small. Also, the detection system will utilize a telephoto lens system in order to image scenes at long distances.

Even further embodiments include (1) the use of an illuminator and a filter in a single package that is designed to mount to a pre-existing camera or telescope or camcorder, etc. Thus the detector system is supplied by the user (in the form of a camera, camcorder, telescope, binoculars, etc.); and (2) hiding the above-described components inside a disguised package. For example, the invention can be packaged to look like a camera, or a camcorder, or a briefcase, or a pair of eyeglasses or sunglasses, or a hat.

Various further embodiments of the present invention are shown in FIGS. 15–26. These embodiments represent possible variations of the illuminator 30 and optical receiving means 54 and their associated control optics/electronics 34 and 58 used with the present invention and as shown, for example, in FIG. 2 of the drawings.

What is claimed is:

1. An apparatus for locating an electromagnetic imaging and detection system/device, comprising:
    a source of electromagnetic radiation for emitting a beam of electromagnetic radiation of a preselected wavelength;
    an optical receiving means located a preselected distance from said source of electromagnetic radiation for receiving retro-reflected electromagnetic radiation resulting from said beam of electromagnetic radiation striking at least a partially reflective surface of the electromagnetic imaging and detection system/device, said retro-reflected electromagnetic radiation defining a retro-reflected zone of electromagnetic radiation;
    said optical receiving means also being capable of receiving reflected scene electromagnetic radiation, resulting from scene reflection of naturally occurring light from sources external to the apparatus along with scene reflection of said beam of electromagnetic radiation, in addition-to said retro-reflected electromagnetic radiation;
    said preselected distance of said optical receiving means from said source of electromagnetic radiation being such that said optical receiving means is at least partially within said retro-reflected zone of electromagnetic radiation; and
    at least one distinguishing-characteristic associated with at least one of said retro-reflected electromagnetic radiation and said reflected scene electromagnetic radiation for differentiating said retro-reflected electromagnetic radiation from said reflected scene electromagnetic radiation;
    whereby reception of retro-reflected electromagnetic radiation by said optical receiving means indicates the location of the electromagnetic imaging and detection system/device.

2. The apparatus of claim 1 wherein said source of electromagnetic radiation includes an optical fiber.

3. The apparatus of claim 1 wherein said optical receiving means includes an optical fiber and said optical fiber is at least partially within said retro-reflected zone of electromagnetic radiation.

4. The apparatus of claim 1 wherein said optical receiving means comprises a CCD camera and said CCD camera is at least partially within said retro-reflected zone of electromagnetic radiation.

5. The apparatus of claim 1 wherein said optical receiving means comprises a photodetector and said photodetector is at least partially within said retro-reflected zone of electromagnetic radiation.

6. The apparatus of claim 1 wherein said preselected wavelength is in the range of 0.1–15 microns.

7. The apparatus as defined in claim 1 wherein said optical receiving means comprises an electronic device.

8. The apparatus as defined in claim 1 wherein said optical receiving means comprises a telescope device.

9. The apparatus of claim 1 wherein said beam of electromagnetic radiation is capable of being pulsed at predetermined cyclic rates undetectable by the human eye and preselected CCD arrays, said optical receiving means being in the form of a detector which is capable of detecting said pulsed beams of electromagnetic radiation upon being retro-reflected from said electromagnetic imaging and detection system/device.

10. The apparatus of claim 1 further comprising:
    a housing encasing the apparatus; and
    a panning/tilting system connected to said housing;
    whereby said apparatus for locating an electromagnetic imaging and detection system/device is capable of scanning a room in order to facilitate locating the electromagnetic imaging and detection system/device.

11. The apparatus as defined in claim 10 wherein said housing is configured to provide a disguise for the use of the apparatus.

12. The apparatus of claim 10 further comprising a computer operably attached to said panning/tilting system for controlling the operation of said panning/tilting system.

13. The apparatus of claim 1 wherein the electromagnetic imaging and detection system/device is a camera.

14. The apparatus of claim 1 wherein the electromagnetic imaging and detection system/device is an infrared detector.

15. The apparatus of claim 1 further comprising another optical receiving means for only receiving said reflected scene electromagnetic radiation.

16. The apparatus as defined in claim 1 wherein said optical receiving means which is at least partially within said retro-reflected zone of electromagnetic radiation is defined as an on-axis optical receiving means and is capable of receiving reflected scene electromagnetic radiation as well as said retro-reflected electromagnetic radiation; and said apparatus further comprising an off-axis optical receiving means for receiving reflected scene electromagnetic radiation, said off-axis optical receiving means being located outside of said retro-reflected zone of electromagnetic radiation.

17. The apparatus as defined in claim 16 wherein said on-axis and said off-axis optical receiving means comprises a binocular system in which one eye of a viewer sees both said retro-reflected electromagnetic radiation and said scene electromagnetic radiation while another eye of the viewer sees only said scene electromagnetic radiation.

18. An apparatus for locating an electromagnetic imaging and detection system/device, comprising:
    a first source of electromagnetic radiation for emitting a first beam of electromagnetic radiation of a preselected wavelength;
    a second source of electromagnetic radiation for emitting a second beam of electromagnetic radiation of a preselected wavelength;
    an optical receiving means located a preselected distance from said first source of electromagnetic radiation for receiving retro-reflected electromagnetic radiation resulting from said first beam of electromagnetic radiation striking at least a partially reflective surface of the electromagnetic imaging and detection system/device, said retro-reflected electromagnetic radiation defining a retro-reflected zone of electromagnetic radiation;

said optical receiving means also being capable of receiving reflected scene electromagnetic radiation, resulting from scene reflection of naturally occurring light from sources external to the apparatus along with scene reflection of said first and said second beams of electromagnetic radiation, in addition to said retro-reflected electromagnetic radiation;

said preselected distance between said optical receiving means from said first source of electromagnetic radiation being such that said optical receiving means is at least partially within said retro-reflected zone of electromagnetic radiation;

at least one distinguishing characteristic associated with at least one of said retro-reflected electromagnetic radiation and said reflected scene electromagnetic radiation for differentiating said retro-reflected electromagnetic radiation from said reflected scene electromagnetic radiation;

whereby reception of retro-reflected electromagnetic radiation by said optical receiving means indicates the location of the electromagnetic imaging and detection system/device.

19. The apparatus of claim 18 wherein said at least one characteristic is provided by means for switching said first source of electromagnetic radiation on and off in cyclic fashion.

20. The apparatus of claim 18 wherein said first and said second preselected wavelengths are substantially identical and said second source of electromagnetic radiation continually emits said second beam of electromagnetic radiation while said first source of electromagnetic radiation is switched on and off in cyclic fashion.

21. The apparatus of claim 18 wherein said first and said second preselected wavelengths are different.

22. The apparatus of claim 18 wherein said first beam of electromagnetic radiation is pulsed at predetermined cyclic rates undetectable by the human eye and preselected CCD arrays, said optical receiving-means being in the form of a detector which is capable of detecting said pulsed beams of electromagnetic radiation upon being retro-reflected from said electromagnetic imaging and detection system/device.

23. The apparatus as defined in claim 18 wherein said viewing means comprises an electronic device.

24. The apparatus of claim 18 wherein the electromagnetic imaging and detection system/device is a camera.

25. The apparatus of claim 18 wherein the electromagnetic imaging and detection system/device is an infrared detector.

26. The apparatus as defined in claim 18 wherein said viewing means comprises a telescope device.

27. The apparatus of claim 18 further comprising:
a housing encasing the apparatus for locating an electromagnetic imaging and detection system; and
a panning/tilting system connected to said housing;
whereby said apparatus for locating an electromagnetic imaging and detection system/device can scan a room in order to locate the electromagnetic imaging and detection system/device.

28. The apparatus of claim 27 further comprising a computer operably attached to said panning/tilting system for controlling the operation of said panning/tilting system.

29. An apparatus for locating an electromagnetic imaging and detection system/device, comprising:
a housing; and
said housing having incorporated therewith the following:
a source of electromagnetic radiation for emitting a beam of electromagnetic radiation of a first preselected color;
viewing means for receiving retro-reflected electromagnetic radiation resulting from said beam of electromagnetic radiation striking at least a partially reflective surface of the electromagnetic imaging and detection system/device, said retro-reflected electromagnetic radiation defining a retro-reflected zone of electromagnetic radiation;
said viewing means also being capable of receiving reflected scene electromagnetic radiation, resulting from scene reflection of naturally occurring light from sources external to the apparatus along with scene reflection of said beam of electromagnetic radiation, in addition said retro-reflected electromagnetic radiation;
an aperture located within said housing;
beam directing means optically positioned between said source of electromagnetic radiation and said viewing means for directing a substantial portion of said electromagnetic radiation of said first preselected color out of said housing through said aperture;
a filter of a second preselected color positioned to partially overlap said aperture yet not obscure said beam directing means, said reflected scene electromagnetic radiation passing through said filter; and
said viewing means capable of receiving said scene electromagnetic radiation in said second preselected color and said retro-reflected electromagnetic radiation in said first preselected color;
whereby reception of said retro-reflected electromagnetic radiation in said first preselected color by said viewing means indicates the location of the electromagnetic imaging and detection system/device.

30. The apparatus as defined in claim 29 wherein said housing is configured to provide a disguise for the use of the apparatus.

31. The apparatus as defined in claim 29 wherein said first preselected color is red.

32. The apparatus as defined in claim 29 wherein said second preselected color is green.

33. The apparatus as defined in claim 29 further comprising a polarizing filter adjacent to said aperture.

34. The apparatus as defined in claim 29 wherein said aperture is covered by a transparent member.

35. The apparatus as defined in claim 29 wherein said viewing means comprises an electronic device.

36. The apparatus as defined in claim 29 wherein said viewing means comprises a telescope device.

37. The apparatus of claim 29 further comprising:
a panning/tilting system operably connected to said housing;
whereby said apparatus for locating an electromagnetic imaging and detection system/device can scan a room in order to locate the electromagnetic imaging and detection system.

38. The apparatus of claim 37 further comprising a computer operably attached to said panning/tilting system for controlling the operation of said panning/tilting system.

39. The apparatus of claim 29 wherein the electromagnetic imaging and detection system/device is a camera.

40. The apparatus of claim 29 wherein the electromagnetic imaging and detection system/device is an infrared detector.

41. An apparatus for locating an electromagnetic imaging and detection system/device, comprising:
a housing; and
said housing having incorporated therewith the following:
a first source of electromagnetic radiation for emitting a first beam of electromagnetic radiation at a first preselected wavelength;
a second source of electromagnetic radiation for emitting a second beam of electromagnetic radiation at a second preselected wavelength;
viewing means for receiving retro-reflected electromagnetic radiation resulting from said first beam of electromagnetic radiation striking at least a partially reflective surface of the electromagnetic imaging and detection system/device, said retro-reflected electromagnetic radiation defining a retro-reflected zone of electromagnetic radiation;
said viewing means also being capable of receiving reflected scene electromagnetic radiation, resulting from scene reflection of naturally occurring light from sources external to the apparatus along with scene reflection of said first and said second beams of electromagnetic radiation, in addition to said retro-reflected electromagnetic radiation;
at least one distinguishing characteristic associated with at least one of said retro-reflected electromagnetic radiation and said reflected scene electromagnetic radiation for differentiating said retro-reflected electromagnetic radiation from said reflected scene electromagnetic radiation;
an exit portion,-said exit portion defining an area for said first and said second beams of electromagnetic radiation to exit said housing;
beam directing means optically positioned between said source of electromagnetic radiation and said viewing means for directing a substantial portion of said first beam of electromagnetic radiation out of said housing through said exit portion of said housing; and
said second beam of electromagnetic radiation exiting said housing through said exit portion spaced apart a preselected distance from said viewing means;
whereby reception of said retro-reflected electromagnetic radiation by said viewing means indicates the location of the electromagnetic imaging and detection system/device.

42. The apparatus as defined in claim 41 wherein said housing is configured to provide a disguise for the use of the apparatus.

43. The apparatus of claim 41 wherein said first and said second preselected wavelengths are substantially identical and said second source of electromagnetic radiation continually emits said second beam of electromagnetic radiation while said first source of electromagnetic radiation is switched on and off in cyclic fashion, said on and off in cyclic fashion representing said distinguishing characteristic.

44. The apparatus of claim 41 wherein said first and said second preselected wavelengths are different, the different wavelength of said first preselected wavelength representing said distinguishing characteristic.

45. The apparatus of claim 41 wherein said first and said second beams of electromagnetic radiation are both pulsed at predetermined cyclic rates undetectable by the human eye and preselected CCD arrays, said viewing means being in the form of a detector which is capable of detecting said pulsed beams of electromagnetic radiation.

46. The apparatus of claim 41 wherein said first beam of electromagnetic radiation is red.

47. The apparatus of claim 41 wherein said second beam of electromagnetic radiation is green.

48. The apparatus as defined in claim 41 wherein said exit portion of said housing defines an area for said first and said second beams of electromagnetic radiation to exit the housing, and said exit portion being in the form of a first and a second aperture for said first and said second beams of electromagnetic radiation to exit said housing, respectively.

49. The apparatus as defined in claim 41 wherein said beam directing means comprises a transparent member and a prism.

50. The apparatus as defined in claim 41 wherein said first and said second sources of electromagnetic radiation are positioned with respect to each other such that said first and said second beams of electromagnetic radiation overlap each other outside of said housing at a preselected distance from said exit portion of said housing.

51. The apparatus as defined in claim 41 wherein said first and second preselected wavelength are in the range of 0.1 to 15 microns.

52. The apparatus as defined in claim 41 wherein said viewing means comprises a telescope device.

53. The apparatus as defined in claim 41 wherein said telescope device comprises a lens, a linear polarizing filter and a negative lens.

54. The apparatus as defined in claim 41 further comprising a power source, an on-off switch and an electronics board, said electronics board being connected between said power source, said on-off switch, said first source of electromagnetic radiation and said second source of electromagnetic radiation.

55. The apparatus as defined in claim 48 wherein said beam directing means comprises a transparent member and a prism.

56. The apparatus as defined in claim 55 wherein said first and said second sources of electromagnetic radiation are positioned with respect to each other such that said first and said second beams of electromagnetic radiation overlap each other outside of said housing at a preselected distance from said exit portion of said housing.

57. The apparatus as defined in claim 56 wherein said first and second preselected wavelength are in the range of 0.1 to 15 microns.

58. The apparatus as defined in claim 57 wherein said viewing means comprises a telescope device.

59. The apparatus as defined in claim 58 wherein said telescope device comprises a lens, a linear polarizing filter and a negative lens.

60. The apparatus as defined in claim 59 further comprising a power source, an on-off switch and an electronics board, said electronics board being connected between said power source, said on-off switch, said first source of electromagnetic radiation and said second source of electromagnetic radiation.

61. The apparatus of claim 60 wherein said first beam of electromagnetic radiation is red.

62. The apparatus of claim 60 wherein said first and said second preselected wavelengths are substantially identical and said second source of electromagnetic radiation continually emits said second beam of electromagnetic radiation while said first source of electromagnetic radiation is switched on and off in cyclic fashion, said on and off in cyclic fashion representing said distinguishing characteristic.

63. The apparatus of claim 41 further comprising:

a panning/tilting system operably connected to said housing;

whereby said apparatus for locating an electromagnetic imaging and detection system/device can scan a room in order to locate the electromagnetic imaging and detection system/device.

64. The apparatus of claim 53 further comprising a computer operably attached to said panning/tilting system for controlling the operation of said panning/tilting system.

65. The apparatus of claim 41 wherein the electromagnetic imaging and detection system/device is a camera.

66. The apparatus of claim 41 wherein the electromagnetic imaging and detection system/device is an infrared detector.

67. An apparatus for locating an electromagnetic imaging and detection system/device, comprising:

a source of electromagnetic radiation for emitting a beam of electromagnetic radiation of a preselected wavelength;

an on-axis optical receiving means located a preselected distance from said source of electromagnetic radiation for receiving retro-reflected electromagnetic radiation resulting from said beam of electromagnetic radiation striking at least a partially reflective surface of the electromagnetic imaging and detection system/device, said retro-reflected electromagnetic radiation defining a retro-reflected zone of electromagnetic radiation;

said on-axis optical receiving means also being capable of receiving reflected scene electromagnetic radiation, resulting from scene reflection of naturally occurring light from sources external to the apparatus along with scene reflection of said beam of electromagnetic radiation, in addition to said retro-reflected electromagnetic radiation;

said preselected distance of said on-axis optical receiving means from said source of electromagnetic radiation being such that said on axis optical receiving means is at least partially within said retro-reflected zone of electromagnetic radiation; and an off-axis optical receiving means for receiving only reflected scene electromagnetic radiation, said off-axis optical receiving means being located outside of said retro-reflected zone of electromagnetic radiation whereby reception of retro-reflected electromagnetic radiation by said on-axis optical receiving means indicates the location of the electromagnetic imaging and detection system/device.

68. The apparatus as defined in claim 67 wherein said on-axis and said off-axis optical receiving means comprises a binocular system in which one eye of a viewer sees both said retro-reflected electromagnetic radiation and said scene electromagnetic radiation while another eye of the viewer sees only said scene electromagnetic radiation.

69. A method of locating an electromagnetic imaging and detection system/device, comprising the steps of:

generating a beam of electromagnetic radiation;

directing said beam of electromagnetic radiation at various locations within defined area;

providing an on-axis optical receiving means for receiving retro-reflected electromagnetic radiation resulting from said beam of electromagnetic radiation striking at least a partially reflective surface of the electromagnetic imaging and detection system/device, and also being capable of receiving reflected scene electromagnetic radiation, resulting from scene reflection of naturally occurring light from sources external to the apparatus along with scene reflection of said beam of electromagnetic radiation, in addition to said retro-reflected electromagnetic radiation;

receiving, by said optical receiving means, said retro-reflected electromagnetic radiation and said reflected scene electromagnetic radiation; and ascertaining the location of the electromagnetic imaging and detection system/device based upon the reception of said retro-reflected electromagnetic radiation by said optical receiving means.

70. The method as defined in claim 69 further comprising the step of defining a retro-reflected zone of electromagnetic radiation by said retro-reflected electromagnetic radiation.

71. The method as defined in claim 70 further comprising the step of positioning said optical receiving means within said retro-reflected zone of electromagnetic radiation.

72. The method as defined in claim 71 further comprising the step of providing a second source of electromagnetic radiation.

73. The method as defined in claim 72 further comprising the step of positioning said first and said second sources of electromagnetic radiation with respect to each other such that said first and said second beams of electromagnetic radiation overlap each at a preselected location.

74. The method as defined in claim 69 further comprising the step of providing another optical receiving means for only receiving said reflected scene radiation.

75. The method as defined in claim 69 wherein the electromagnetic imaging and detection system/device is a camera.

76. The method as defined in claim 69 wherein the electromagnetic imaging and detection system/device is an infrared detector.

77. A method of locating an electromagnetic imaging and detection system/device, comprising the steps of:

generating a beam of electromagnetic radiation;

directing said beam of electromagnetic radiation at various locations within defined area;

providing an on-axis optical receiving means for receiving retro-reflected electromagnetic radiation resulting from said beam of electromagnetic radiation striking at least a partially reflective surface of the electromagnetic imaging and detection system/device, and also being capable of receiving reflected scene electromagnetic radiation, resulting from scene reflection of naturally occurring light from sources external to the apparatus along with scene reflection of said beam of electromagnetic radiation, in addition to said retro-reflected electromagnetic radiation;

providing an off-axis optical receiving means for receiving only reflected scene electromagnetic radiation, said off-axis optical receiving means being located outside of said retro-reflected zone of electromagnetic radiation;

receiving, by said on-axis optical receiving means, said retro-reflected electromagnetic radiation and said reflected scene electromagnetic radiation; and ascertaining the location of the electromagnetic imaging and detection system/device based upon the reception of said retro-reflected electromagnetic radiation by said on-axis optical receiving means.

* * * * *